United States Patent
Goenka

(10) Patent No.: US 8,533,225 B2
(45) Date of Patent: Sep. 10, 2013

(54) REPRESENTING AND PROCESSING INTER-SLOT CONSTRAINTS ON COMPONENT SELECTION FOR DYNAMIC ADS

(75) Inventor: Vishal Goenka, Foster City, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 12/891,595

(22) Filed: Sep. 27, 2010

(65) Prior Publication Data

US 2012/0078961 A1    Mar. 29, 2012

(51) Int. Cl.
*G06F 17/30* (2006.01)

(52) U.S. Cl.
USPC ............................................ 707/778

(58) Field of Classification Search
USPC ..................... 707/778, E17.014, 999.003; 705/14.4–14.73
See application file for complete search history.

(56) References Cited

U.S. PATENT DOCUMENTS

| | | | |
|---|---|---|---|
| 8,041,699 B2* | 10/2011 | Sacco | 707/705 |
| 2001/0020236 A1* | 9/2001 | Cannon | 707/1 |
| 2001/0044758 A1* | 11/2001 | Talib et al. | 705/27 |
| 2003/0191688 A1* | 10/2003 | Prince et al. | 705/14 |
| 2005/0076293 A1* | 4/2005 | Beresnevichiene | 715/514 |
| 2006/0004721 A1* | 1/2006 | Bedworth et al. | 707/3 |
| 2007/0260520 A1 | 11/2007 | Jha et al. | |
| 2008/0103897 A1* | 5/2008 | Flake et al. | 705/14 |
| 2008/0140603 A1* | 6/2008 | Babikov et al. | 706/59 |
| 2008/0195596 A1* | 8/2008 | Sisk et al. | 707/5 |
| 2010/0199257 A1* | 8/2010 | Biggerstaff | 717/104 |
| 2012/0030069 A1* | 2/2012 | Garg et al. | 705/27.1 |

* cited by examiner

*Primary Examiner* — Brannon W Smith
*Assistant Examiner* — Randall Burns
(74) *Attorney, Agent, or Firm* — Fish & Richardson P.C.

(57) ABSTRACT

Systems, methods, and computer-readable media for representing and processing inter-slot co-occurrence constraints on component selection for dynamically generated content items are disclosed. Components available for constructing the content items are organized into a hierarchy of categories. Co-occurrence constraints are specified in terms of categories in the hierarchy rather than explicit enumerated black-lists or white-lists at the component-to-component level. A set of processing rules based on the hierarchical taxonomy are used to expand a set of co-occurrence constraints specified in terms of categories into explicit enumerations of allowed component combinations, and to resolve potential conflicts in the set of co-occurrence constraints in a predictable manner. The explicit enumerations of allowed component combinations can be stored in a relational data table. When constructing a content item, candidate components can be obtained by querying the relational data table.

14 Claims, 13 Drawing Sheets

REPRESENTING AND PROCESSING INTER-SLOT CONSTRAINTS ON COMPONENT SELECTION FOR DYNAMIC ADS

BACKGROUND

This specification relates to representing and processing co-occurrence constraints on component selection for constructing content items.

The Internet provides access to a wide variety of resources (e.g., images, video and/or audio files, search engines, news portals, gaming websites, social networking sites, as well as individual web pages pertaining to particular subjects). Access to these resources presents opportunities for advertisements to be provided with the resources. For example, a web page can include advertisement slots in which advertisements can be presented. Advertisement slots can be allocated to selected advertisers based on various matching criteria (e.g., keywords, bids, geographic region, time, etc.). Advertisements from the selected advertisers can be presented in the advertisements slots when the webpage is accessed by a consumer.

An advertisement can be a static advertisement that is prepared, stored, and ready for selection to fulfill a subsequently received ad request. The content and format of the static advertisement is stable and does not vary once it has been created.

An advertisement can also be a dynamic advertisement. A dynamic advertisement is constructed on-the-fly according to an ad template when fulfilling a received ad request. The ad template can specify an invariable portion of the content and format for the dynamic ad and one or more component slots in which components that have different content, format, and/or attributes can be selected and applied to create the dynamic ad.

An ad server can have access to a large number of available components of various types and varying content. The available components can be provided, for example, via one or more component feeds. The ad server can select components from among the large number of components, and apply the selected components to the component slots in the ad template according to the specifications of the ad template. Once the dynamic ad is constructed using the selected components, the dynamic ad can be provided to a requesting device to fulfill the received ad request.

SUMMARY

In general, one innovative aspect of the subject matter described in this specification can be embodied in methods that include the actions of: storing a representation of a taxonomy for components that are available for constructing content items, wherein the taxonomy includes a hierarchy of categories, and each component belongs to one or more categories each descending from a root category through respective zero or more intermediate categories in the hierarchy; receiving a set of co-occurrence constraints on component selection for constructing the content items, wherein at least a first co-occurrence constraint of the set of co-occurrence constraints specifies a permission or a prohibition of simultaneous selection of components from a first collection of components and components from a second collection of components for a single content item, and wherein the first co-occurrence constraint identifies at least the first collection of components in terms of an intermediate category in the hierarchy of categories; and determining an eligible pair of components for constructing a first content item based on the taxonomy and the set of co-occurrence constraints.

These and other embodiments can each optionally include one or more of the following features.

In some implementations, the first co-occurrence constraint specifies the second collection of components in terms of a category in the hierarchy or a component that belongs to a category of the hierarchy.

In some implementations, the methods further include the actions of: identifying, based on the taxonomy, two or more child categories descending from the intermediate category specified in the first co-occurrence constraint; and generating two or more partially expanded co-occurrence constraints from the first co-occurrence constraint, where each of the two or more partially expanded co-occurrence constraints specifies the permission or the prohibition of simultaneous selection of components from the second collection of components and components from a respective partial subset of the first collection of components, and where each of the partially expanded co-occurrence constraints identifies the respective partial subset of the first collection of items in terms of a respective one of the two or more child categories descending from the intermediate category specified in the first co-occurrence constraint.

In some implementations, the set of co-occurrence constraints further includes a second co-occurrence constraint, the second co-occurrence constraint being specified between the second collection of components and a first partial subset of the first collection of items, and the second co-occurrence constraint identifying the first partial subset of the first collection of components in terms of a first child category descending from the intermediate category specified in the first co-occurrence constraint. The methods further include the actions of: determining whether the second co-occurrence constraint conflicts with a first partially expanded co-occurrence constraint generated from the first co-occurrence constraint; and upon determination that there is a conflict between the second co-occurrence constraint and the first partially expanded co-occurrence constraint, overriding the first partially expanded co-occurrence constraint using the second co-occurrence constraint.

In some implementations, each of the set of co-occurrence constraints is specified in terms of two or more categories in the hierarchy, and the permission or the prohibition of simultaneous selection of components specified in the co-occurrence constraint applies by default to all subcategories that descend from the two or more categories.

In some implementations, the methods further include the actions of: processing the set of co-occurrence constraints in an order according to a top-down deterministic traversal of the hierarchy, wherein each unprocessed co-occurrence constraint in the set of co-occurrence constraints is processed when a category specified in the unprocessed co-occurrence constraint is reached during the top-down deterministic traversal of the hierarchy; and resolving conflicts between the set of co-occurrence constraints that are discovered during the top-down deterministic traversal of the hierarchy, in an order in which the conflicts are discovered.

In some implementations, the action of processing of an unprocessed co-occurrence constraint further include the actions of: determining whether the unprocessed co-occurrence constraint conflicts with a combined co-occurrence constraint generated from previously processed co-occurrence constraints; and in response to determination that the unprocessed co-occurrence constraint conflicts with the combined co-occurrence constraint, modifying the combined co-occurrence constraint for the categories specified in the unprocessed co-occurrence constraint according to the unprocessed co-occurrence constraint.

In some implementations, the categories of the taxonomy are defined based on content of the components available for structuring the content items, each component belongs to a respective parent category and all categories from which the respective parent category descends, and each component is associated with one of a plurality of component types based on a structure of the component or a function of the component in the content items.

In some implementations, the action of storing the representation of the taxonomy further includes the actions of: storing a directed acyclic graph, each category of the taxonomy being represented as a node in the directed acyclic graph, and a directed edge from a first node to a second node in the directed acyclic graph indicates that a second category represented by the second node descends from a first category represented by the first node and that the second category is a subcategory of the first category.

In some implementations, each of the set of co-occurrence constraints is expressed as a respective (n+1)-tuple of a form $(c\_1, c\_2, \ldots, c\_n, \text{Boolean})$, where $c\_1, c\_2, \ldots, c\_n$ are nodes in the directed acyclic graph, and the Boolean represents either a permission or a prohibition of simultaneous selection of n components, each of the n components being associated with a respective one of the n nodes.

In some implementations, the methods further include the actions of: processing the set of co-occurrence constraints to obtain a set of allowed component combinations; storing the set of allowed component combinations in a relational data table; querying the relational data table based on a pre-selected first component for a first component slot of a content template; and obtaining one or more candidate components for a second component slot of the content template, where the one or more candidate components and the pre-selected first component satisfy the set of co-occurrence constraints.

In some implementations, the methods further include the actions of: processing at least one of set of co-occurrence constraints to obtain a corresponding default co-occurrence constraint that is not explicitly included in the set of co-occurrence constraints, where the at least one co-occurrence constraint specifies a lowest level category among all the co-occurrence constraints in the set of co-occurrence constraint set and specifies a co-occurrence limitation of a first type, and where the corresponding default co-occurrence constraint is a more generally applicable co-occurrence constraint than the at least one co-occurrence constraint, the default co-occurrence constraint specifying a co-occurrence limitation of a second type opposite to the first type, and applicable to all combinations not covered by the at least one co-occurrence constraint.

In some implementations, the methods further include the actions of: receiving one or more additional sets of co-occurrence constraints specified in terms of categories and components in the hierarchy; and determining respective eligible pairs of components for constructing the first content item based on the taxonomy and the one or more additional sets of co-occurrence constraints.

In some implementations, the methods further include the actions of: associating each of the set of co-occurrence constraints and the one or more additional sets of co-occurrence constraints with a respective advertising strategy; and evaluating the respective advertising strategies based on information collected on advertisements constructed according to each of the set of co-occurrence constraints and the one or more additional sets of co-occurrence constraints.

In some implementations, the methods further include the actions of: processing the set of co-occurrence constraints to obtain a first combined co-occurrence constraint of a first type, the first type being one of a white-list constraint type and a black-list constraint type; converting the first combined co-occurrence constraint to a corresponding second combined co-occurrence constraint, the second combined co-occurrence constraint is equivalent to the first combined co-occurrence constraint and is of a second type, wherein the second type is one of the white-list constraint type and the black-list type, and is different from the first type; and storing the second combined co-occurrence constraint in a relational data table instead of the first combined co-occurrence constraint.

In some implementations, the methods further include the actions of: processing the set of co-occurrence constraints to obtain a set of allowed component combinations; storing the set of allowed component combinations in a relational data table, wherein at least some of the allowed component combinations are specified in terms of categories in the hierarchy; and inferring allowed component combinations not explicitly stored in the relational data table based on inheritance at the time of determining the eligible pair of components for constructing the first content item.

In some implementations, the methods further include the actions of: processing the set of co-occurrence constraints to obtain a set of allowed component combinations; storing the set of allowed component combinations in a relational data table; querying the relational data table to obtain eligible combinations of components for a multi-slot content template; and obtaining one or more candidate component combinations for the multi-slot content template, where the one or more candidate component combinations satisfy the set of co-occurrence constraints.

In some implementations, the one or more candidate component combinations are ranked based on performance data associated with the candidate component combinations.

In some implementations, features from different embodiments described above may be combined. In some implementations, not all features are necessary.

Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages.

When co-occurrence constraints are specified in terms of categories in a component taxonomy hierarchy, a relatively small number of co-occurrence constraints can express the permission or prohibition of a tremendous number of component combinations. Where there are a large number of available components, manual enumeration of all permitted or prohibited component combinations is nearly impossible. By organizing the components in a taxonomy hierarchy and expressing the co-occurrence constraints in terms of the categories in the hierarchy, the permitted or prohibited component combinations can be enumerated by processing the co-occurrence constraints according to a set of processing rules associated with the taxonomy hierarchy. Therefore, managed selection of components from a large number of components becomes feasible.

Co-occurrence constraints can be processed according to a set of processing rules associated with the taxonomy hierarchy. The processing rules include an inheritance rule, a processing order rule, and an override rule based on the structure of the taxonomy hierarchy. Because the structure of the taxonomy hierarchy is relatively stable compared to the set of available components, the processing rules can ensure that the co-occurrence constraints are processed in a predictable and consistent manner. Advertiser's can utilize the knowledge of the processing rules to specify a set of co-occurrence constraints to achieve a desired set of component combinations.

The component taxonomy hierarchy can include categories at many levels of granularities. The advertiser can specify a mixed set of black-list and white-list co-occurrence constraints at different levels of granularities, such that an intricate set of exceptions can be carved out of one or more generally applicable constraints, while explicit enumerations of component-to-component co-occurrence constraints can be avoided.

After a set of co-occurrence constraints have been processed, a resulting set of allowed component combinations can be stored in a relational data table. Queries can be made against the relational data table to obtain candidate components that are compatible with other pre-selected components. Components of a single content item can be selected one by one, and the combination of components can be evaluated based on performance of its individual components.

In addition, by storing the set of allowed component combinations in a relational data table, various data compression techniques can be utilized that allow the set of allowed component combinations to be queried and manipulated through various logic or set operations without the need to decompress the stored data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Component Selection for Dynamic Ads

Figure 1:
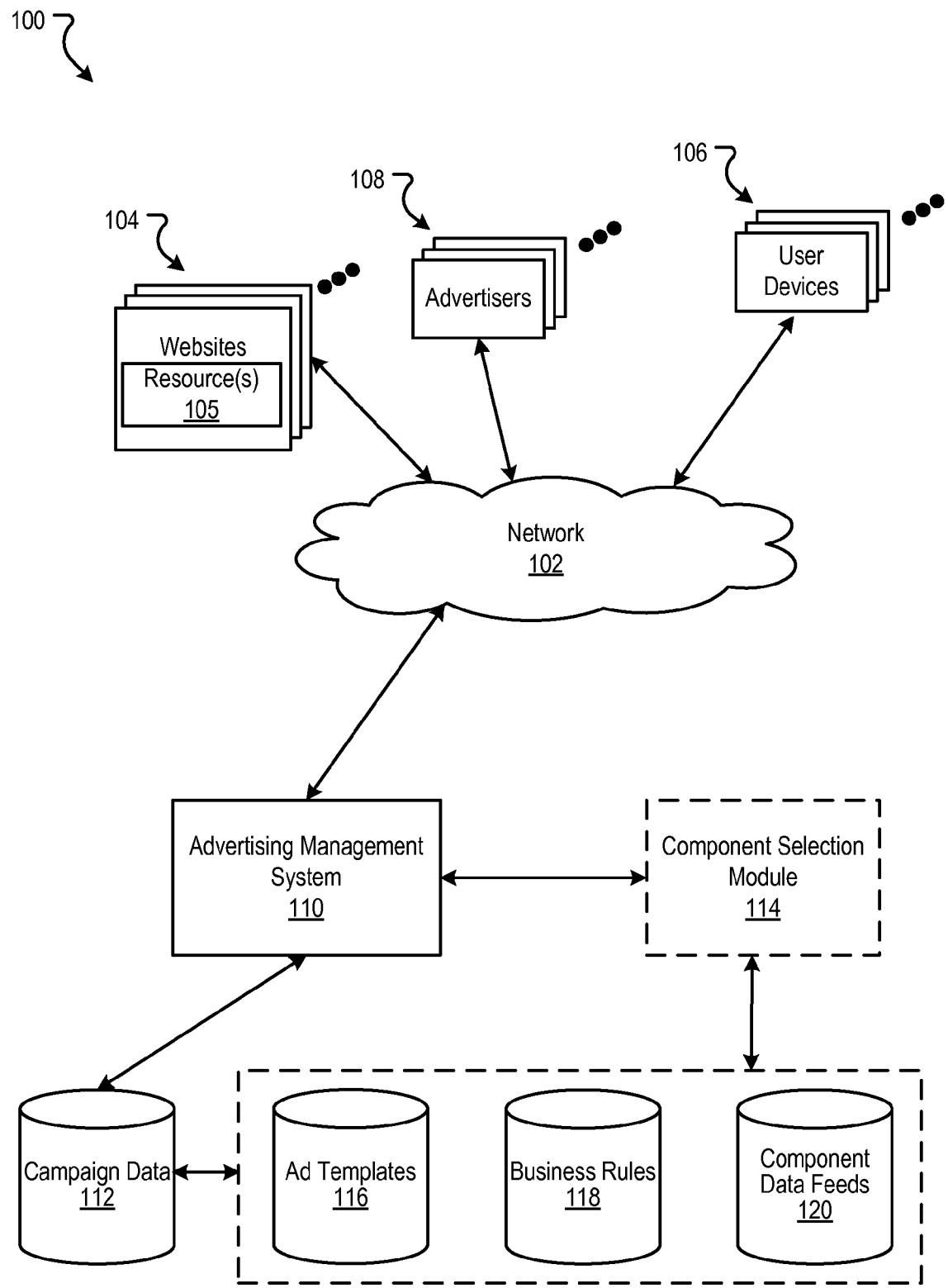
FIG. 1 is a block diagram of an example environment in which an advertisement management system manages advertising services.

Dynamic ads are advertisements that are dynamically generated according to an ad template using one or more components. For example, an ad template can be a creative that specifies one or more component slots each requiring a component of a desired component type, such as a background image, a headline, a promotional slogan, a product image, a price quote, a landing page URL, a call-to-action (e.g., a message promoting a viewer action such as "Register Now!"), and so on. A component can be associated with a single component type based on the component's structural or format characteristics or the component's function in the ad template. In some implementations, a component may also be associated with various attribute values (e.g., color, font, model number, customer rating, etc.). As used in this specification, a component is a data item that has structural and format qualities meeting the specifications of a component type. Components of the same component type are interchangeable in a corresponding component slot of a content item template when constructing a content item. Content items generated using different components for the same component slots are identical except for the portions of each content item that are affected by the content and/or attributes of the different components.

Multiple (e.g., from a few, tens of thousands, to potentially tens of millions) components of each component type can be made available for selection and application to a component slot in the ad template. Components of the same component type can have varying content (e.g., text, image theme, price value, etc.), and descriptive labels of the varying content can be associated with each component. The descriptive labels allow a suitable component to be selected for a component slot based not only on component type but also on content. In some implementations, attribute values can also be used as criteria for selecting a component.

Components available for constructing a dynamic ad can be provided by one or more data feeds. An ad server can select from the data feeds suitable components for the component slots in an ad template in response to a received ad request. The dynamic ad can be created when the selected components are applied to the component slots according to the specifications of the ad template. The created dynamic ad can then be delivered to a requesting user device for presentation.

The advertiser can modify or update the components available in the data feed or data store frequently and have the changes timely reflected in the dynamic ads generated and delivered in response to each ad request.

For example, real business data (e.g., price quote, inventory, product catalogs) can be integrated into the data feed such that the real-time business data can be displayed on the dynamic advertisements shown to customers. For a more specific example, if a product is out of stock, the images of that product can be removed from the component data feed, such that dynamic ads for the out-of-stock product are no longer generated, and the advertising opportunity can be diverted to other products that are still in stock. On the other hand, as new products become available in the catalog or prices are updated due to market change or promotions, these new products and/or price changes can be included in the component data feed and timely reflected in the dynamic ads generated from the data feed without further human intervention.

In addition to varying the quantity and content of the components available for selection in the data feeds, an advertiser can also design various business rules by which the components can be selected for a dynamic ad in response to a received ad request. Some of the business rules can be independently applied. For example, one business rule can specify that a "headline" component slot in an ad template can only be filled by a headline component that contains words matching a keyword specified in the ad request. Another business rule can specify that a product image slot in the ad template can only be filled by a product image having a warm color scheme for ad requests received during the winter months and a cool color scheme for ad requests received during the summer months. In the above example, the first business rule and the second business rule are independently applied, and the selection of components based on the first business rule does not have any influence on the selection of components based on the second business rule, absent any inter-slot constraints.

Multiple business rules can be specified by the advertiser for the construction of a dynamic ad. The business rules can be slot dependent, time dependent, demographic dependent, geographic dependent, and so on. Some business rules can also be conditionally applied. For example, a conditional business rule can specify that components showing promotional prices are only used in a dynamic ad if the click-through rates of past ads did not reach a predetermined threshold value.

Another type of business rules are inter-slot constraints. Inter-slot constraints are business rules that are simultaneously applicable to multiple component slots in an ad template when a dynamic ad is being constructed. The inter-slot constraints can restrict the component selection for the multiple component slots in a single dynamic ad. In its simplest form, an inter-slot constraint restricts the simultaneous selection of two components for a single dynamic ad. The inter-slot constraint can be specified in the form of a prohibition of simultaneous selection of two components (e.g., a black-list co-occurrence constraint). Alternatively, the inter-slot constraint can be specified in the form of an explicit permission or requirement of simultaneous selection of two components (e.g., a white-list co-occurrence constraint). In more complex forms, an inter-slot constraint can restrict the simultaneous selection of more than two components for a single dynamic ad. Inter-slot constraints restrict the simultaneous appearance, i.e., the co-occurrence, of multiple components in a dynamic ad, and are also called "co-occurrence constraints" in this specification.

Black-list co-occurrence constraints can be used to filter out distasteful, illogical, or topically inconsistent component combinations (e.g., a breakfast cereal image with a coupon for soy sauce, or an amusement park image with a headline for back-to-school promotions) in the same dynamic ad. White-list co-occurrence constraint can be used to link components of related themes, topics or content (e.g., images for cheese and wine, images for the beach and promotions for swim suits, etc.) such that the components appear together in a dynamically generated ad.

The following examples illustrate how a co-occurrence constraint can be used to select components for a dynamic ad. In a first example, an ad template for a hotel chain contains an image slot, a headline slot, and a city name slot. A co-occurrence constraint for this ad template can specify that images and headlines depicting family fun on the beach should not be displayed with names of landlocked cities, such as Chicago or Detroit. As a result, simultaneous selection of image and headline components associated with family fun on the beach (e.g., beach.jpg, "Relax with your kids on the beach") and a city name component associated with a landlocked city (e.g., Chicago) is prohibited. The combinations of components that are described by the constraint (e.g., beach.jpg+"Relax with your kids on the beach"+Chicago; white_sand.jpg+"A splash of summer fun"+"Detroit"; and so on) are black-listed component combinations.

In a second example, an electronics retailer has an ad campaign for some key products. The advertiser wishes to promote the key products with their matching accessories. For an ad template that has two product slots, one co-occurrence constraint can specify that any laptop in a "business laptop" category may be (or must be) presented with a printer in the "laser jet" printer category. Another co-occurrence constraint can specify that any laptop in a "home laptop" category may be (or must be) presented with a printer in the "ink jet" printer category. The combinations of components from the "business laptop" category and components from the "laser jet" printer category are white-listed component combinations. Similarly, the combinations of components from the "home laptop" category and components from the "ink jet" printer category are also white-listed component combinations.

In this second example, the component for the first product slot may be chosen independently (e.g., using one or more other independently applied business rules). If the first selected product is a laptop from the "business laptop" category, the component for the second product slot needs to be chosen from the "laser jet" printer category. If the first selected product is a laptop from the "home laptop" category, the component for the second product slot needs to be chosen from the "ink jet" printer category. If the first selected product is not specified in any white-list, the second product can be chosen from any available categories.

An advertiser can provide the white-lists and the black-lists of component combinations that are specified on a component-to-component basis. For example, the explicitly enumerated component combinations can be provided in a text document or a table. The explicitly enumerated component combinations can then be used to identify and filter out prohibited component combinations and/or to suggest acceptable component combinations.

Manually provided explicit enumerations of component combinations are acceptable when the number of available components and combinations are small. However, as the number of available components increases, manual enumeration and storage of all possible component combinations can become very difficult, if not entirely impossible.

In some implementations, an advertiser can provide the white-lists and the black-lists of component combinations in terms of categories. Each category can include multiple components that are interchangeable for component selection. Continue with the hotel chain example described above, the advertiser can categorize available city name components into four different categories: "business," "leisure," "coastal," and "urban." A city name component can belong to multiple categories. For instance, "San Francisco" can belong to the "business," "leisure," and "coastal" categories, whereas "Chicago" can belong to the "urban" and "business" categories. Likewise, the advertiser can group available advertising images to the "leisure," "business," "coastal" and "urban" categories as well, depending on whether the imagery depicts family on vacation versus business travel, and whether the imagery has beaches or parks. The available headline components can be grouped in a similar manner.

After the components are assigned to their respective categories, instead of specifying the inter-slot constraints at a component-level granularity, the advertiser may specify the inter-slot constraints at the level of categories. For example, black-listed component combinations (Image:business, City:leisure), (Image:leisure, City:business), (Image:urban, City:coastal), and (Image:coastal, City:urban) can be specified instead of explicit enumerations of the image and city name combinations. The above black-listed component combinations are merely illustrative, and are not meant to be exhaustive or unique.

By specifying inter-slot constraints using categories, a much smaller number of inter-slot constraints are needed to cover a large number of component combinations. In addition, when components in each category are added, deleted, or modified, the inter-slot constraints and the logic for component selections can remain unchanged.

In some implementations, available components can be categorized into a taxonomy based on various content-related characteristics associated with the components. The various content-related characteristics can include descriptive labels of content, name, appearance, theme, color scheme, price, product line, manufacturer, country, age group, purpose, brand, model, etc. Other characteristics for classifying the component in the taxonomy are possible.

The taxonomy can be a hierarchy of categories descending from a common root category. Each non-root category is either a leaf category with no further subcategories descending from it, or an intermediate category having two or more subcategories descending from it. Each available component can belong to one or more categories based on its associated content-related characteristics. By inheritance, all components of one instant category also belong to all categories from which the instant category descends.

For illustrative purposes, a simple taxonomy can include a root category "all components." The root category can have two sub-categories: "electronics" and "beauty products." The "beauty products" category can be a leaf category with no further sub-categories descending from it. The "electronics" category can be an intermediate category that has three sub-categories descending from it: "cameras," "computers," and "printers." Two of the three subcategories (e.g., "cameras" and "printers") can be leaf categories with no further subcategories, while one of the three subcategories (e.g., "computers") is also an intermediate category with two leaf categories (e.g., "desktops" and "laptops") descending from it. Multiple components can be included in each of the categories. Each category can include components directly and through one or more subcategories.

In some implementations, in the hierarchy of categories, each non-root category can have more than one parent categories, and components that belong to the non-root category also belong to all of the parent categories (and all ancestor categories of the parent categories) by inheritance. For example, a "cameras" category can have two parent categories "electronics" and "photography" in the hierarchical taxonomy. The "electronics" category can descend directly from the root category, while the "photography" category can descend from the root category via another intermediate category "hobbies." Therefore, components belonging to the "cameras" category also belong to the "electronics" category, the "photograph" category, the "hobbies" category, and the root category by inheritance.

By organizing components available for constructing dynamic ads into a hierarchical taxonomy, co-occurrence constraints can be specified between categories, between categories and specific components, and between specific components. When the co-occurrence constraints are specified between categories, or between categories and specific components, the co-occurrence constraint can have various levels of granularities depending on the levels of the categories specified in the co-occurrence constraint. For example, a co-occurrence constraint between the "electronics" category and the "outdoors" category is a coarser constraint as compared to a co-occurrence constraint between the "GPS devices" category and the "outdoors" category, provided that the "GPS devices" category is a sub-category of the "electronics" category in the taxonomy hierarchy.

Given a multi-level hierarchical taxonomy for components available for constructing dynamic ads, an advertiser can specify multiple co-occurrence constraints at varying levels of granularities to achieve a desired set of allowed component combinations without explicitly enumerate all of the allowed component combinations one by one. However, sometimes, when a set of multiple co-occurrence constraints are specified and the set of co-occurrence constraints include a mix of black-list co-occurrence constraints and white-list co-occurrence constraints, the set of co-occurrence constraints may conflict with one another.

For example, a black-list co-occurrence constraint and a white-list co-occurrence constraint may appear compatible at first glance because they specify different pairs of categories. However, by inheritance, the same prohibition (e.g., in a black-list co-occurrence constraint) or permission (e.g., in a white-list co-occurrence constraint) specified in the co-occurrence constraints apply to subcategories and components descending from the specified categories. Therefore, depending on the specific structure of the hierarchical taxonomy, the black-list and the white-list co-occurrence constraints may apply conflicting co-occurrence limitations on the same component or subcategory that descends from the categories specified in the black-list and the white-list constraints. In order to resolve the possible conflicts, rules that govern which constraint takes precedent can be implemented. When the advertiser specifies the set of co-occurrence constraints, the advertiser can take advantage of these rules to achieve the desired configuration for possible component combinations.

In some implementations, each category in the taxonomy hierarchy can be associated with a respective level. The level of an instant category in the taxonomy hierarchy can be defined according to the number of intermediate categories that exist between the instant category and the root category along the shortest path between the instant category and the root category.

For example, if a "cameras" category has two parent categories "electronics" and "photography," where the "electronics" category descends directly from the root category, while the "photography" category descends from the root category via another intermediate category "hobbies," then the level of the root category can be defined as 0, the level of the "electronics" category and the "hobbies" category can be defined as 1, and the level of the "photography" category and the "camera" category can be defined as 2. Even though there are two intermediate categories (e.g., "hobbies" and "photography") between the "camera" category and the root category within the "hobbies" branch, the shortest path between the root category and the "camera" category is along the "electronics" branch. Therefore, the "cameras" category is a level 2 category and not a level 3 category.

For the categories that are within the same level (e.g., having the same number of intermediate categories from the root category along a shortest path), the categories can be associated with a respective order as well. The order within the same level can be determined according to a predetermined criterion, such as by alphabetical order of the category identifiers. Other criteria for determining the order of categories within the same level are possible, as long as the same criterion is consistently used across all sets of co-occurrence constraints.

The respective levels of the categories and the orders of the categories within the same level can be used to determine the order by which the co-occurrence constraint specified the categories should be processed relative to other co-occurrence constraints.

Knowing the order that the co-occurrence constraints will be processed, the advertiser can specify a generally applicable co-occurrence constraint (e.g., a white-list) at a coarse granularity using one or more low level categories (e.g., categories located closer to the root category). The advertiser can further specify one or more additional co-occurrence constraints (e.g., successive alternating black-list and white-list co-occurrence constraints) using successive sub-categories of the initial low level categories.

In a more specific example, suppose that the taxonomy hierarchy includes a root category "all components." The root category includes two subcategories "electronics" and "outdoors." The advertiser can specify a black-list co-occurrence constraint between components in the "electronics" category and components in the "outdoors" category because it is usually awkward to display electronics products with an outdoor theme in the same ad. However, the "electronics" category includes a subcategory "GPS devices," and it would make sense to display GPS devices with an outdoor theme. Therefore, the advertiser can specify a white-list co-occurrence constraint between components in the "GPS devices" category and components in the "outdoors" category. Since the "GPS devices" is a higher level category as compared to the "electronics" category, the white list co-occurrence constraint between the "GPS devices" and "outdoors" categories modifies the blacklist co-occurrence constraint between the "electronics" and "outdoors" categories for components in the "GPS devices" category. Additional co-occurrence constraints can be specified to define additional prohibition and/or permission of component combinations at various levels of granularities.

In some implementations, the advertiser does not need to specify a generally applicable co-occurrence constraint starting from the root of the taxonomy hierarchy. The co-occurrence constraint that specifies a lowest level (e.g., closest to the root) category can be used as an indicator of the default constraint applicable to all components and categories not covered by the set of co-occurrence constraints that the advertiser has specified. For example, if the co-occurrence constraint that specifies the lowest level category among all the co-occurrence constraints in the constraint set is a black-list constraint, then the components and categories not covered by the set of co-occurrence constraints are defaulted to be white-listed to one another. If the co-occurrence constraint that specifies the lowest level category among all the co-occurrence constraints in the constraint set is a white-list constraint, then the components and categories not covered by the set of co-occurrence constraints are defaulted to be black-listed to one another. The above default rule can help reduce the number of co-occurrence constraints needed to achieve a desired configuration of allowed component combinations because most of the combinations can be derived based on the default rule only when needed.

In some implementations, the advertiser can specify more than one set of co-occurrence constraints, where each set of co-occurrence constraints can be applied independent of another set of co-occurrence constraints. The advertiser can specify the conditions under which each set of co-occurrence constraints becomes applicable in component selection for a dynamic ad. The advertiser can also use the different sets of co-occurrence constraints to test out different advertising strategies.

For example, an advertiser sells apparel (men's and women's) and makes tops (e.g., shirts, blouses, t-shirts, camisoles, etc.) and bottoms (e.g., slacks, jeans, pants, skirts, etc.) in various colors. The advertiser's catalog contains categories such as "men's tops," "men's bottoms," "women's tops," and "women's bottoms." Each piece of apparel may be available in multiple colors. In the product catalog, color is an attribute of the product. The advertiser can specify an independently applied business rule requiring that either men's apparel or women's apparel are selected for a dynamic ad depending on the requesting user's gender. The ad template has two component slots, one for tops, and the other for bottoms. The advertiser can specify a black-list co-occurrence constraint that prohibits simultaneous selection of two tops or two bottoms.

The advertiser may also wishes to experiment with two strategies to validate which color matching approach works best. In the first approach, the top and the bottom should be of different colors. To implement this, the advertiser can specify a black-list co-occurrence constraint on a combination of top color and bottom color, such as (color:black, color:black), (color:grey, color:grey), (color:yellow, color:yellow), etc. In the second approach, the top and the bottom should be of the same colors. To implement the second approach, the advertiser can specify a white-list co-occurrence constraint on a combination of top color and bottom color, such as (color:white, color:white), (color:grey, color:grey), (color:yellow, color:yellow), etc. The two component selection strategies can be applied for an equal number of ads and the performance of the ads can be used to determine which of the two component selection strategies (e.g., color combination strategies) work better.

An Example Online Advertising Environment

An advertiser can specify parameters of advertising campaigns and advertisements through an advertising management system. The advertising management system can receive ad requests from user devices and select ads according to information in the ad requests and the parameters of the advertising campaigns. The ads that are delivered can include dynamically generated ads as described above. The specification of co-occurrence constraints and ad templates, the selection of components for constructing a dynamic ad in response to a received ad request, and the management of component data feeds can be accomplished at the advertising management system as well.

FIG. 1 is a block diagram of an example environment 100 in which an advertising management system 110 manages advertising services. The example environment 100 includes a network 102, such as a local area network (LAN), a wide area network (WAN), the Internet, or a combination thereof. The network 102 connects websites 104, user devices 106, advertisers 108, and the advertising management system 110. The example environment 100 may include many thousands of websites 104, user devices 106, and advertisers 108.

A website 104 include one or more resources 105 (e.g., text, images, multimedia content, and programming elements, such as scripts) associated with a domain name and hosted by one or more servers. The resources 105 can be relatively static (e.g., as in a publisher's webpage) or dynamically generated in response to user query (e.g., as in a search engine's result page).

A user device 106 is an electronic device that is under the control of a user and is capable of requesting and receiving resources over the network 102. Examples of user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying an ad slot in which advertisements can be presented.

When a resource 105 is requested by a user device 106, the advertisement management system 110 receives a request for advertisements to be provided with the resource 105. The request for advertisements can include characteristics of the advertisement slots (e.g., size, web address of the resource, media type of the requested advertisement, etc.) that are defined for the requested resource or search results page, and can be provided to the advertising management system 110.

Based on data included in the request for advertisements, the advertising management system 110 can identify advertisements that are eligible to be provided in response to the request. For example, eligible advertisements can have characteristics matching the characteristics of available advertisement slots and have targeting keywords that match the specified resource keywords or search queries.

Each advertiser 108 can create one or more advertising campaigns using various campaign parameters that are used to control distribution of the advertiser's advertisements. Each advertising campaign can include one or more ad groups that have modified campaign parameters that are specific to the ad group. Examples of campaign parameters can include targeting keywords and corresponding bids, geographic or demographic targeting criteria, delivery period, content network, keyword match type, as well as other parameters corresponding to one or more advertisements. The campaign data can be stored in the campaign data store 112. The advertising management system 110 can retrieve the information in the campaign data store 112 when preparing a response to an ad request.

Parameters related to an advertisement can include, for example, creative identifier, creative name, creative type, size, first line, web address of the landing page, display URL, media type, and so on. One of the creative types that an advertiser can specify for an ad is the dynamic ad type. The advertiser can provide an ad template as the creative, and the ad template can be selected (e.g., in the same manner as other types of creatives) to fulfill a received ad request for an available advertisement slot. When an ad template (or in other words, a dynamic ad creative) is selected to fulfill an ad request, a dynamic ad can be generated on-the-fly based on the ad template to fulfill the ad request.

The ad template can specify the general appearance, such as an invariable portion of the content and some aspects of the appearance and format of the dynamic ad. The invariable portion of the content and aspects of the dynamic ad remains the same across multiple dynamic ads generated using the same ad template.

In addition to specifying the invariable portion of the dynamic ad, the ad template also leaves some content or aspects of format and appearance of the dynamic ad unspecified. Instead, the ad template can specify one or more component slots which prescribe the requirements for data items (or components) that can be used to provide the unspecified content and aspects of format and appearance to complete the dynamic ad. Components having component characteristics (e.g., content, structural format, function, or other attributes) that satisfy the requirements of the component slots can be selected and inserted into the component slots to complete the dynamic ad. In some implementations, the ad templates can also specify how a selected component is applied to the component slot, such as the size, font, color, position, etc of the selected component as the component appears in the dynamic ad.

The advertisers can specify multiple dynamic ad creatives or ad templates for use in the advertiser's ad campaigns. The ad templates can be stored along with other creatives (e.g., static image ads, video ads, text ads, etc.) in the campaign data store 112. In some implementations, the ad templates can be stored separately from the other types of creatives, for example, in an ad template data store 116. Individual ad templates can be retrieved by the advertising management system 110 by the templates' creative IDs.

The advertising management system 110 can have access to a large number of available components of various types, for example, through a component data feed or data store 120. The components can have varying content. The component data feed 120 can be provided and updated by the advertiser from time to time. In some implementations, the component data feed 120 can be linked to the advertiser's product catalogs or other business data stores, such that real-time data can be made available to the advertising management system 110 without active intervention by the advertiser.

The advertising management system 110 can select components from among the large number of components available in the component data feed 120. The advertising management system 110 can also apply the selected components to the component slots in a dynamic ad according to the specifications in an ad template selected from the ad template store 116. Once the dynamic ad is constructed using the selected components, the dynamic ad can be provided by an ad server to fulfill the received ad request. In some implementations, a component selection module 114 can be implemented to carry out actions related to component selection. The component selection module 114 can be part of the advertising management system 110 or a standalone module in communication with the advertising management system 110.

When the advertising management server 110 selects components for the selected ad template in response to a received ad request, the advertising management server 110 observes the business rules including the co-occurrence constraints specified for the selected ad template. The business rules can be specified by the advertiser through an interface provided by the advertising management server 110. The business rules can be stored in the campaign data store along with other campaign data. Alternatively, the business rules can be stored in a business rule data store 118 apart from other types of campaign data. The business rules can be campaign specific, ad group specific, or ad template specific, for example.

An Example Representation of a Component Taxonomy Hierarchy

Conventionally, if the advertiser wishes to prohibit or require particular component combinations in a dynamic ad, the advertiser needs to explicitly enumerate all of the particular component combinations either in a black-list or a white-list. Each component combination needs to be specified between two specific components. Explicit enumeration of co-occurrence constraints at the component level can become difficult, time consuming, and costly, when the number of available components is large. For example, when the number of available components reaches beyond a few hundreds, the number of possible component combinations can become impossible to fully enumerate manually. In addition, when the black lists and white lists of component combinations are explicitly enumerated at the component level, any change in the set of available components would require the black lists and the white lists to be updated as well.

To simplify the expression of the co-occurrence constraints and reduce the total number of co-occurrence constraints needed to express the entire set of allowed or prohibited component combinations, the available components can be organized into a taxonomy hierarchy. The taxonomy hierarchy includes a hierarchy of categories and organizes the components based on various characteristics associated with the components. When an advertiser specifies the co-occurrence constraints for an ad template, each co-occurrence constraint can be specified in terms of two categories and/or a category and a specific component, instead of explicitly enumerated pairs of components. In some cases, a small number of explicitly enumerated pairs of components can still be included in the set of co-occurrence constraints, along with the co-occurrence constraints specified in terms of categories.

In an example implementation, each available component is associated with one or more content-related characteristics that can be used to categorize the component into the hierarchical taxonomy. The content-related characteristics can be a descriptive label for some aspects of the content of the component, and which is also descriptive of two or more components. In some implementations, descriptive labels of other characteristics for the component, such as a price, a time, a product line, a theme, and so on, can also be used to categorize components. Because each component can be associated with more than one content-related characteristic, the component can belong to more than one branch of the taxonomy hierarchy.

For example, an image component can be associated with a content label "beach" and a color scheme label "white and blue." The same component can belong to two branches of the hierarchical taxonomy, where a first branch starts from the root category and leads to the category including the "beach" theme, and a second branch starts from the root category and leads to a category including the "white and blue" color scheme.

In addition to the content-related characteristics that are used to categorize components into the hierarchical taxonomy, each component is also associated with a single component type. The component type of a component describes the component's structure or the component's function in the dynamic ad. Examples of component types can include background image, retail product, headline text, call-to-action, URL text, promotional message, and so on. Each category in the hierarchical taxonomy can include multiple types of components that have content-related characteristics belonging to that category.

In some implementations, each component can also be associated with other attributes (e.g., owner, rating, performance stats, etc.) that are not necessarily used to categorize the components into the taxonomy hierarchy. These attributes can be used as additional filters to further modify the application of co-occurrence constraints and the component selection for constructing a dynamic ad.

Figure 2:
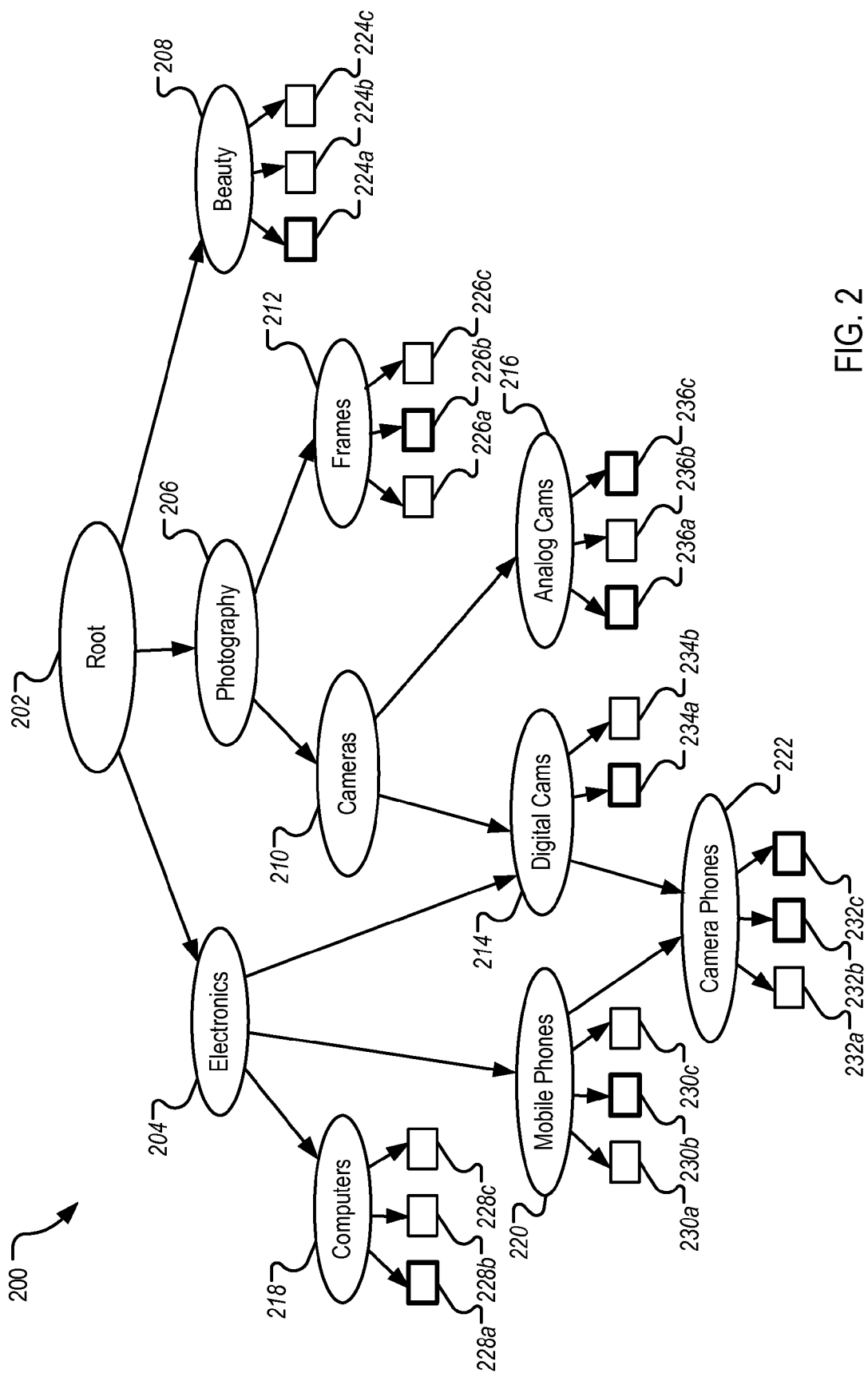
FIG. 2 illustrates an example component taxonomy hierarchy.

In some implementations, the component taxonomy can be represented by a directed acyclic graph. FIG. 2 shows an example directed acyclic graph 200 representing a simplified component taxonomy hierarchy. The directed acyclic graph 200 includes a root node 202 from which all other nodes of directed acyclic graph 200 descend. Each internal node of the directed acyclic graph 200 represents a category to which components can be assigned based on one of the component's content-related characteristics. Each leaf nodes of the directed acyclic graph 200 represents a component belonging to a parent category represented by the parent node of the leaf node. Each node of the directed acyclic graph 200 is linked with each of one or more other nodes by a respective directed edge. The direction of the edge represents a parent-child relationship between the two nodes linked by the directed edge, and the super-category to sub-category relationship between the two categories represented by the two linked nodes.

As shown in FIG. 2, the directed acyclic graph 200 has a root node 202 from which all non-root nodes descend. Shown for the root node 202 are three child nodes (e.g., nodes 204, 206, and 208 representing categories "electronics," "photography," and "beauty"). The three child nodes (e.g., nodes 204, 206, and 208) descending from the root node 202 defines three branches of the hierarchical taxonomy. Each branch can further have sub-branches each leading to one or more leaf nodes and/or additional sub-branches. In practice, the root node 202 has many more child nodes.

The child nodes descending from the root node 202 can be an internal node with additional child nodes descending from it, or a leaf node with no additional child nodes descending from it. An internal node that only has leaf nodes descending from it represents a leaf category having no subcategories. An internal node that has other internal nodes descending from it represents an intermediate category that has subcategories represented by these other internal nodes.

In this example, the internal node 208 represents a leaf category "beauty." In contrast, the internal node 204 represents an intermediate category "electronics," and the internal node 206 represents another intermediate category "photography."

Each internal node representing an intermediate category can have additional child nodes that also represent intermediate categories. For example, the internal node 204 representing the "electronics" category is the parent node of another two internal nodes 220 and 214 representing intermediate categories "mobile phones" and "digital cams." For another example, the internal node 206 is the parent node of another internal node 210 representing the intermediate category "camera."

Internal nodes that do not have further internal nodes descending from it represent leaf categories with no subcategories. In the example directed acyclic graph 200, the internal nodes that represent leaf categories include internal node 208 (e.g., representing the "beauty" category), internal node 212 (e.g., representing the "frames" category), internal node 216 (e.g., representing the "analog cameras" category), internal node 222 (e.g., representing the "camera phones" category), and internal node 218 (e.g., representing the "computers" category).

Leaf nodes of the directed acyclic graph 200 represent components available for selection for constructing a dynamic ad. Components are assigned into a parent category in the taxonomy hierarchy based on one of the component's content-related characteristics. The same component can be assigned to more than one parent category in the taxonomy hierarchy based on the component's various content-related characteristics. In addition, each component can also belong to ancestor categories (or super-categories) of the component's parent categories by inheritance.

As illustrated in the directed acyclic graph 200, each leaf node of the directed acyclic graph 200 represents a component belonging to a parent category represented by the parent node of the leaf node. Each component also belongs to all super-categories represented by the ancestor nodes of the parent node by inheritance. For example, leaf nodes 224a-c represent components belonging to the "beauty" category represented by the internal node 208. Leaf nodes 226a-c represent components belonging to the "frames" category represented by the internal node 212. Leaf nodes 236a-c represent components belonging to the "analog cameras" category represented by the internal node 216. Leaf nodes 234a-b represent components belonging to the "digital cams" category represented by the internal node 214. Leaf nodes 232a-c represent components belonging to the "camera phones" category represented by the internal node 222. Leaf nodes 230a-c represent components belonging to the "mobile phones" category represented by the internal node 220. Leaf nodes 228a-c represent components belonging to the "computers" category represented by the internal node 218.

By virtue of inheritance, components 224a-c also belong to the root category represented by the root node 202. Components 226a-c also belong to the "photography" category and the root category, each represented by an ancestor node of the components' parent node 212. Components 236a-c also belong to the "camera" category, the "photography" category, and the root category, each represented by an ancestor node of the components' parent node 216. Components 234a-b also belong to the "cameras" category, the "photography" category, and the root category, each represented by an ancestor node of the components' parent node 214. Components 232a-c also belong to the "digital cams" category, the "cameras" category, the "photography" category, and the root category, each represented by an ancestor node of the components' parent node 222. Components 230a-c also belong to the "electronics" category and the root category, each represented by an ancestor node of the components' parent node 220. Components 228a-c also belong to the "electronics" category and the root category, each represented by an ancestor node of the components' parent node 218.

In the directed acyclic graph 200, some nodes have more than one parent node and exist in more than one branch of the hierarchical taxonomy. For example, the internal node 214 representing the "digital cams" category is a child node of both the parent node 204 (e.g., representing the "electronics" category) and the parent node 210 (e.g., representing the "camera" category). For another example, the node 222 representing the "camera phone" category is a child node of both the parent node 220 (e.g., representing the category "mobile phones") and the parent node 214 (e.g., representing the category "digital cams").

Therefore, based on inheritance, components belonging to the "digital cams" category also belong to the "electronics" category represented by a second ancestor node (e.g., node 204) of the component's parent node 214. Similarly, components belong to the "camera phones" category also belong to the "mobile phones" category and the "electronics" category, each represented by a second and a third ancestor nodes of the components' parent node 222. Although not shown in the directed acyclic graph 200, leaf nodes representing components can also belong to more than one parent node.

In the directed acyclic graph 200, each leaf node can represents a component of a single component type. In some implementations, the component types associated with each component can be represented by an associated value (intuitively termed "color") of the leaf node representing the component. As illustrated in FIG. 2, the leaf nodes that are of the same component type have the same "color." Each internal node can have leaf nodes of different colors descending from the internal node. In this simplified example, suppose only two component types have been defined: a product image component type, and a headline message component type. The two component types are indicated on the leaf nodes representing the components (e.g., the bolded line represents one color/type, and the regular line represents the other color/type).

By representing and storing the component taxonomy hierarchy as a directed acyclic graph, the nodes of the directed acyclic graph can be traversed in a deterministic (e.g., a top-down breadth first) manner. In a deterministic traversal of the directed acyclic graph, the nodes are discovered according to a fixed order. The order by which the nodes are discovered during the deterministic traversal can be used to determine the precedent between conflicting co-occurrence constraints that touch upon the same pair of components, category and component, or category and category. The processing for resolving potential conflicts between a set of co-occurrence constraints are discussed in more detail in the sections below.

Example Representation and Processing of a Set of Co-Occurrence Constraints

Representation and processing of co-occurrence constraints in a co-occurrence constraint set can be carried out based on the structure of the component taxonomy hierarchy. Each pair-wise co-occurrence constraint can be specified as a three-tuple (node_1, node_2, Boolean). Node_1 and node_2 in the three-tuple each represents a collection of components to which the co-occurrence constraint is applicable. The collection of components represented by each of node_1 and node_2 can be a category or a specific component in the hierarchical taxonomy. Node_1 and node_2 can be a node (e.g., either an internal node or a leaf node) in the directed acyclic graph representing the hierarchical taxonomy.

The Boolean in the three-tuple represents either a prohibition (e.g., Boolean=FALSE) or a permission or requirement (e.g., Boolean=TRUE) of simultaneous selection of components from a first collection of components and components from a second collection of components, where the first collection of components is a category of components or a single component represented by node_1 in the directed acyclic graph, and the second collection of components is a category of components or a single component represented by node_2 in the directed acyclic graph. Node_1 and node_2 are typically different nodes in the directed acyclic graph, but specifying the same nodes in the co-occurrence constraint is permissible. For example, a blacklist co-occurrence constraint specifying the same categories can indicate that components from the same category cannot be selected twice for a single content item.

The set of co-occurrence constraints can be provided by an advertiser in the form of a table or a text document containing the three-tuples representing the co-occurrence constraints. In some implementations, the advertising management system can provide a graphical representation of the hierarchical component taxonomy to help the user understand the relationship between the categories, so that the user can specify co-occurrence constraints that would cover the desired component combinations.

In order to detect and resolve the potential conflicts that may exist between the co-occurrence constraints in the set of co-occurrence constraints, the advertising management system (e.g., through a component selection module) can process the set of co-occurrence constraints according to a set of predetermined processing rules.

In some implementations, the processing rules include an inheritance rule which dictates that a co-occurrence constraint specified between a first category and a second category implies by default that the same constraint (e.g., prohibition or permission of co-occurrence) applies between: (A) the subcategories and components of the first category and (B) the subcategories and components of the second category.

In some implementations, a co-occurrence constraint can be modeled as a colored edge linking two nodes in directed acyclic graph of the taxonomy hierarchy. For example, a white colored edge can represent a permission of co-occurrence between the components of the first node and the components of the second node, while a black colored edge can represent a prohibition of co-occurrence between the components of the first node and the components of the second node. The inheritance rule can thus be modeled as a shadowing effect that can propagate the colored edge to each pair of nodes that has one node within the branch of the first node and the other node within the branch of the second node.

Figure 3A:
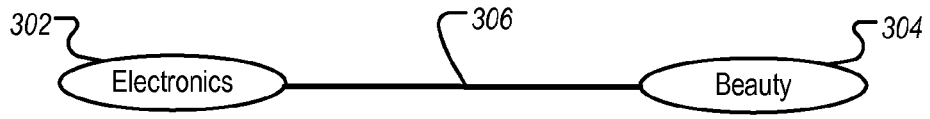
FIGS. 3A-3C illustrate various representations of a co-occurrence constraint obtained through the operation of an inheritance rule associated with the taxonomy hierarchy.
Figure 3B:
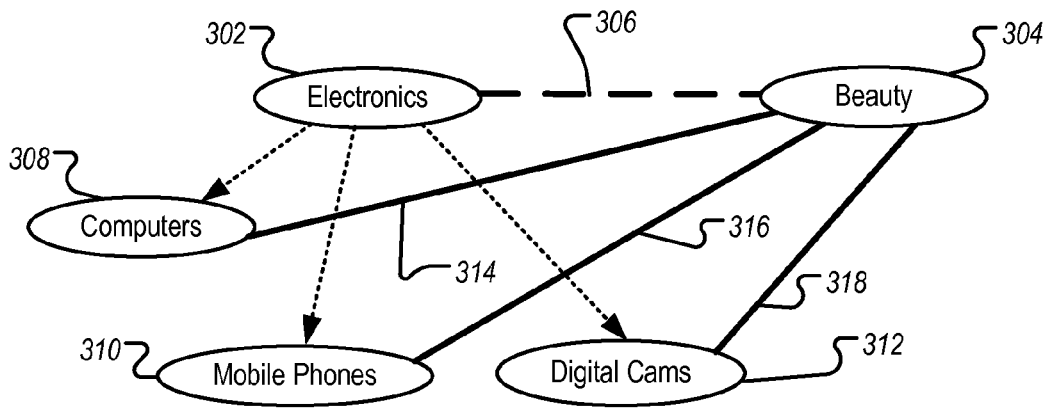
Figure 3C:
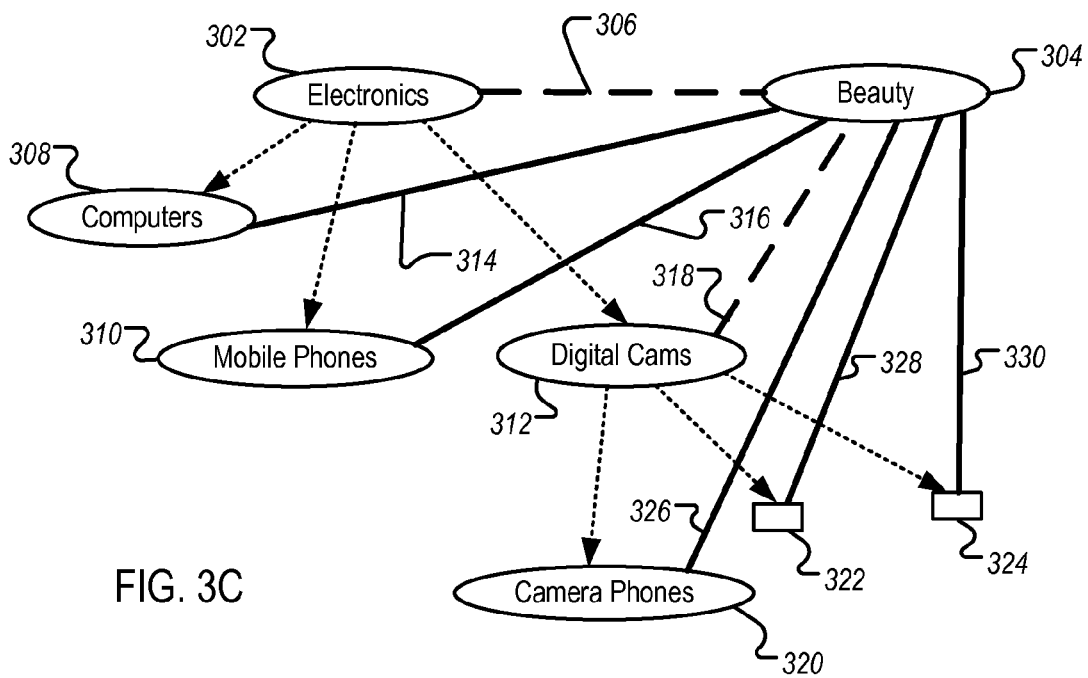

In some implementations, when applying the inheritance rule, not all levels of descendent nodes of the two nodes in the original three-tuple need to be expanded and explicitly represented. For example, based on the taxonomy shown in FIG. 2, a co-occurrence constraint three-tuple (electronics, beauty, FALSE) represents a prohibition of simultaneous selection of components from the "electronics" category and components from the "beauty" category. FIG. 3A-3C illustrate a few representations of this co-occurrence constraint that can be generated based on the hierarchical taxonomy shown in FIG. 2 and the inheritance rule.

For example, FIG. 3A can represent the original co-occurrence constraint three-tuple (electronics, beauty, FALSE). The first node "electronics" 302 is linked with the second node "beauty" 304 by a colored edge 306. In this case, the co-occurrence constraint is a black list constraint, and can be represented by a black colored edge 306. The colored edge can be an undirected edge for co-occurrence constraint that is not directional between the two specified nodes (e.g., nodes 302 and 304).

According to the inheritance rule, the same colored edge can be propagated to pairs of nodes with one node within the branch of the first node in the original three-tuple and the other node within the branch of the second node in the original three-tuple. As shown in FIG. 3B, the first node "electronics" has three child nodes descending from it. The three child nodes can represent a first level expansion within the branch of the first node. The same prohibition of simultaneous selection that applies to the first node "electronics" can propagate to the three child nodes 308, 310, and 312 according to the inheritance rule. Therefore, colored edge 314 can be formed between the child node 308 and the second node 304; colored edge 316 can be formed between the child node 310 and the second node 304; and colored edge 318 can be formed between the child node 312 and the second node 304. Since in this simplified example, node 302 only has three child nodes 308, 310, and 312, the colored edge between node 302 and node 304 is equivalent to the three colored edges 314, 316, and 318. The colored edge 306 is therefore redundant and can be optionally discarded in the representation of the co-occurrence constraint shown in FIG. 3B.

In FIG. 3B, the second node 304 is not expanded. However, it is also possible to expand the second node 304 to its child nodes within the branch of the second node 304, and propagate the colored edges to pairs of nodes with one node being a child node of the second node, and the other node being either the first node or a child node of the first node.

In FIG. 3C, a child node 312 of the first node 302 is further expanded into three child nodes 320, 322, and 324. In this example, the node 320 represents a category, while the nodes 322 and 324 each represents a component. The same prohibition of simultaneous selection that applies to the first node "electronics" can propagate to the three child nodes 320, 322, and 324 via the intermediate node 312 according to the inheritance rule. Therefore, colored edge 326 can be formed between the child node 320 and the second node 304; colored edge 328 can be formed between the child node 322 and the second node 304; and colored edge 330 can be formed between the child node 324 and the second node 304. Since in this simplified example, node 312 only has three child nodes 320, 322, and 324, the colored edge 318 between node 312 and node 304 is equivalent to the three colored edges 326, 328, and 330. The colored edge 318 is therefore redundant and can be optionally discarded in the representation of the co-occurrence constraint shown in FIG. 3C.

Other representations of the co-occurrence constraint (electronics, beauty, FALSE) are possible. For the application of the inheritance rule, a suitable level of expansion of the categories specified in the original co-occurrence constraint can be determined based on the existence of other co-occurrence constraints in the constraint set that may affect the sub-categories or components of the categories specified in the original co-occurrence constraint. For example, if it is determined that a co-occurrence constraint in its original form are not modified by other co-occurrence constraint in the co-occurrence constraint set, the co-occurrence constraint can remain in its original form, so that storage and processing cost associated with the expansion and constraint propagation can be avoided.

In some implementations, the set of co-occurrence constraints can include a mix of black-list co-occurrence constraints and white-list co-occurrence constraints. Sometimes, the black-list co-occurrence constraints and the white-list co-occurrence constraints can specify conflicting constraints to the same pairs of components, category and component, and/or categories. In order to resolve the conflicts in a predictable manner, the set of co-occurrence constraints can be processed according to a processing order rule and an override rule.

The processing order rule can be used to determine the order by which each constraint in the set of constraints should be processed. The same processing order rule can be used across multiple sets of co-occurrence constraints to ensure that the processing orders are consistent and predictable.

The override rule can be used to determine which co-occurrence constraint takes precedent when a co-occurrence constraint processed later in time conflict with one or more co-occurrence constraints processed earlier in time. In some implementations, the override rule can dictate that a co-occurrence constraint processed later in time can override a co-occurrence constraint processed earlier in time for one or more component/category pairs, provided that the later processed co-occurrence constraint conflicts with the earlier processed co-occurrence constraint for the one or more component/category pairs.

In some implementations, the processing order rule sorts the set of co-occurrence constraints using the categories specified in the co-occurrence constraints. The categories specified in a co-occurrence constraint are represented by corresponding nodes in a directed acyclic graph. The levels and positions of particular nodes in the directed acyclic graph can be used to determine the order by which co-occurrence constraints containing those particular nodes are processed.

For example, if a first co-occurrence constraint specifies a first node, a second co-occurrence constraint specifies a second node, and the first node is closer (e.g., with fewer intermediate nodes) to the root node than the second node via a shortest directed path, then the first co-occurrence constraint can be processed before the second co-occurrence constraint. The processing order based on the relative distances between the root node and the nodes specified in the co-occurrence constraints can help ensure that co-occurrence constraint specified at a more general level are processed first, and can be modified by co-occurrence constraints specified at a more specific level.

In some implementations, in order to determine the order by which the co-occurrence constraints in a constraint set are processed, the directed acyclic graph representing the hierarchical taxonomy can be traversed in a deterministic (e.g. a top-down breadth first) manner. During the top-down breath first traversal, the traversal within the same level of the directed acyclic graph away from the root node can be based on a predetermined criterion, such as an alphabetical order of the node identifiers. Other predetermined criterion that traverses the nodes within the same level in a deterministic manner can also be used.

At the start of the traversal, all of the set of co-occurrence constraints are unprocessed co-occurrence constraints. During the deterministic top-down breadth first traversal of the directed acyclic graph, each time when a node is encountered in the directed acyclic graph and the encountered node is found in an unprocessed co-occurrence constraint, then that unprocessed co-occurrence constraint is processed. When there is no more unprocessed co-occurrence constraint left in the set of co-occurrence constraints, the traversal can be stopped.

In some implementations, when a node specified in an unprocessed co-occurrence constraint is encountered during the traversal of the directed acyclic graph, the unprocessed co-occurrence constraint can be processed regardless of whether the encountered node is the first node or the second node specified in the co-occurrence constraint three-tuple.

In some implementations, when two co-occurrence constraints share one common node (e.g., node A), but specify different other nodes: node B and node C, then node B and node C can be used to break the tie for the processing order. Between the two co-occurrence constraints, the co-occurrence constraint that contains the node that would be encountered first (e.g., node B) during the traversal of the directed acyclic graph can be processed before the co-occurrence constraint that contains the other node (e.g., node C).

When processing a co-occurrence constraint, the co-occurrence constraint can be compared against a combined co-occurrence constraint generated based on previously processed co-occurrence constraints. If the unprocessed co-occurrence constraint does not conflict with the combined co-occurrence constraint, then the unprocessed co-occurrence constraint is integrated into the combined co-occurrence constraint. If the unprocessed co-occurrence constraint does conflict with a portion of the combined co-occurrence constraint, when integrating the unprocessed co-occurrence constraint into the combined co-occurrence constraint, the unprocessed co-occurrence constraint overrides the combined co-occurrence constraint for pairs of components/categories for which the conflicts have been detected. When the integration and all necessary overrides are completed, the unprocessed co-occurrence is considered processed, and the combined co-occurrence constraint is a consistent set of constraints that takes into account of all processed co-occurrence constraints in the constraint set.

Figure 4A:
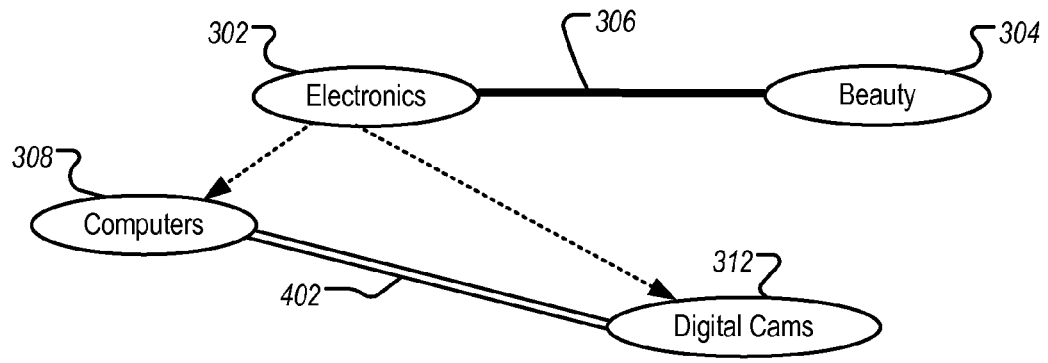
FIGS. 4A-4C illustrate the operation of a processing order rule and an override rule associated with the taxonomy hierarchy.
Figure 4B:
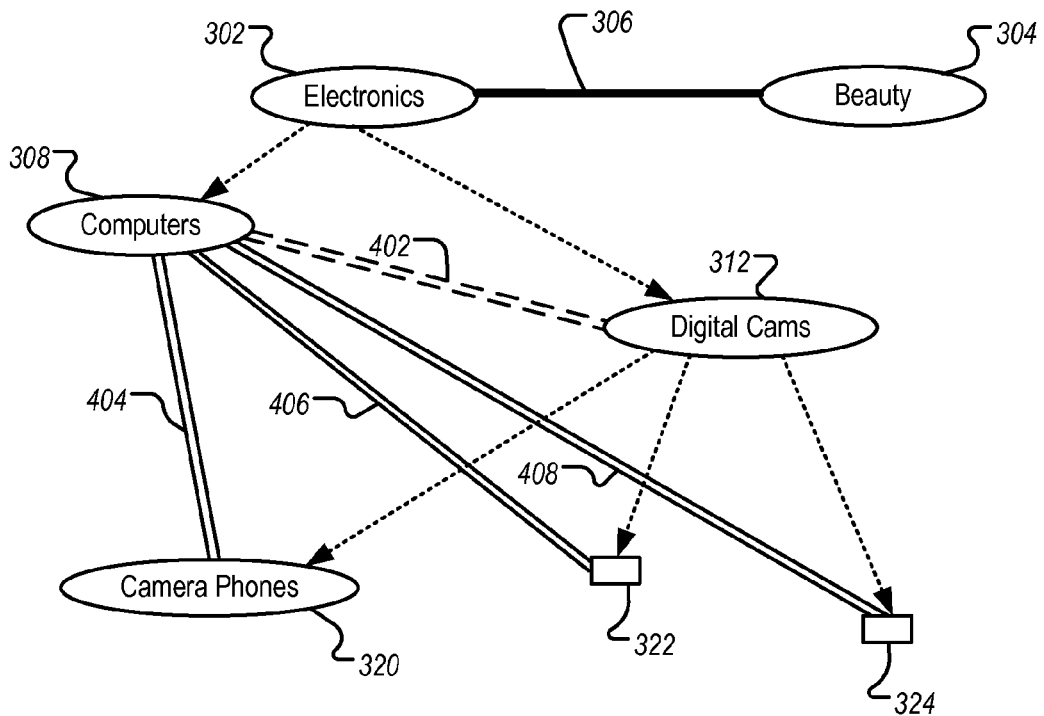
Figure 4C:
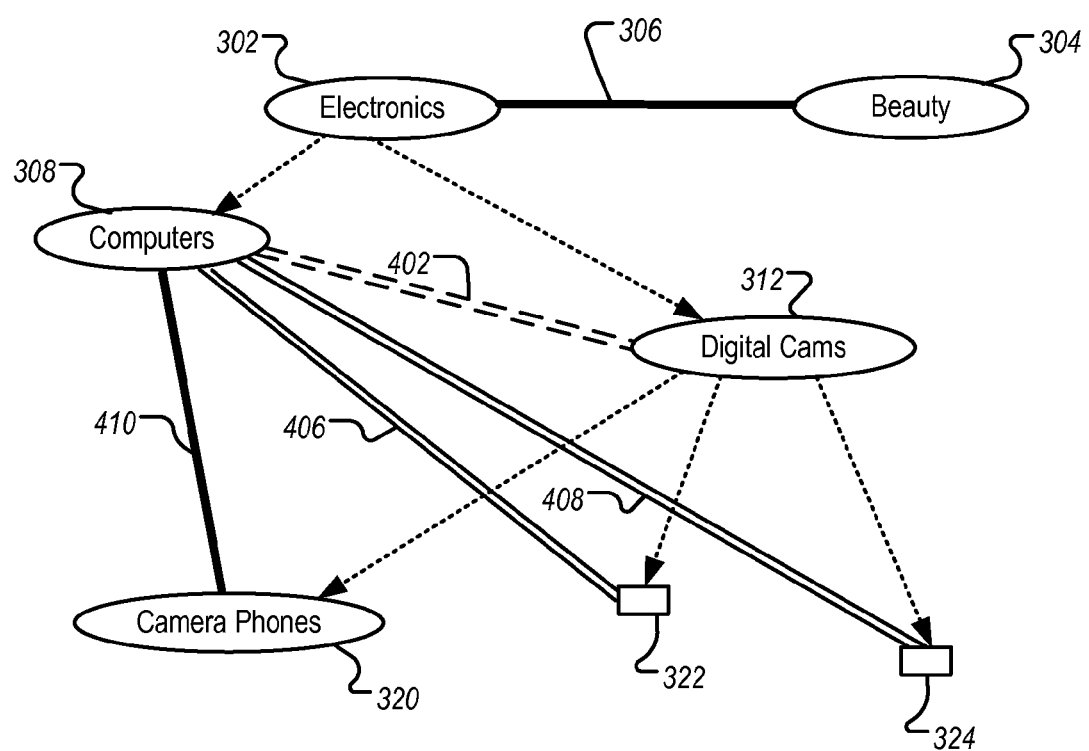

FIGS. 4A-4C illustrate the process of generating a combined co-occurrence constraint based a set of co-occurrence constraints specified according to the hierarchical taxonomy shown in FIG. 2. Suppose the constraint set includes three co-occurrence constraints. The first co-occurrence constraint is (electronics, beauty, FALSE), the second co-occurrence constraint is (computers, digital cams, TRUE), and the third co-occurrence constraint is (computers, camera phones, FALSE). Since there is a mixture of black-list constraints and white-list constraints, there is a potential for conflicts.

By traversing the hierarchical taxonomy 200 shown in FIG. 2 in a top-down breadth first manner, the nodes specified in the set of co-occurrence constraints can be encountered in the following order: (1) electronics, (2) beauty, (3) computers, (4) digital cams, and (5) camera phones. In this example, the order of traversal within the same level of the directed acyclic graph can be based on a predetermined criterion, such as by increasing node identifier values. In some implementations, a different predetermined criterion may be used to obtain a different ordering of the nodes within the same level of the directed acyclic graph, as long as all nodes in the directed acyclic graph can be traversed in a deterministic manner.

According to the order that nodes specified in the set of co-occurrence constraints are encountered during the traversal of the directed acyclic graph (e.g., (1) electronics, (2) beauty, (3) computers, (4) digital cams, and (5) camera phones), the processing order of the set of co-occurrence constraints containing the nodes can be determined.

In this example, the first co-occurrence constraint (electronics, beauty, FALSE) contains the "electronics" node, and is processed first. Any of the representations shown in FIGS. 3A-C can be used to represent the combined co-occurrence constraint at this stage. In some implementations, to save storage and processing, the representation shown in FIG. 3A can be used to represent the combined co-occurrence constraint at this stage.

Between the remaining two co-occurrence constraints, since they specify the same first node "computers," the second node is used to break the tie for the processing order. Since "digital cams" is encountered first during the traversal of the directed acyclic graph 200, the second co-occurrence constraint specifying the node "digital cams" is therefore processed next.

Since the second co-occurrence constraint (computer, digital cams, TRUE) does not conflict with the current combined co-occurrence constraint, the second co-occurrence constraint is integrated into the combined co-occurrence constraint without overriding any part of the combined co-occurrence constraint. Since the second co-occurrence constraint is a permission or white-list for the specified component combinations, a white colored edge is added to link the specified categories "computers" and "digital cams" in the representation shown in FIG. 3A. The resulting combined co-occurrence constraint after processing the first and the second co-occurrence constraints can be represented by the graph shown in FIG. 4A. The black colored edge 306 between the node "electronics" 302 and the node "beauty" 304, and the white colored edge 402 between the node "computers" 308 and the node "digital cams" 312 together represent the combined co-occurrence constraint generated from the first and the second co-occurrence constraints.

The third co-occurrence constraint is processed last. When processing the third co-occurrence constraint, the third co-occurrence constraint is compared against the combined co-occurrence constraint generated based on the previously processed co-occurrence constraints (e.g., the first and the second co-occurrence constraints).

In this example, the third co-occurrence constraint (computers, camera phones, FALSE) is a prohibition or black list of component combinations between the category "computers" and the category "camera phones." In the hierarchical taxonomy 200, "camera phones" is a sub-category of "digital cams." Therefore, by the operation of the inheritance rule, the white colored edge 402 between node "computers" 308 and node "digital cams" 312 implies a white colored edge 404 between the node "computers" 308 and the node "camera phones" 320, a white colored edge 406 between the node "computers" 308 and the component node 322, and a white colored edge 408 between the node "computers" 308 and the component node 322. The white colored edge 402 is equivalent to the three white colored edges 404, 406, and 408, and can be discarded from the representation of the combined co-occurrence constraint, as shown in FIG. 4B.

When the third co-occurrence constraint (computers, camera phones, FALSE) is compared to the combined co-occurrence constraint (e.g., the representation shown in FIG. 4B), a conflict is detected for the categories "computers" and "camera phones." Based on the two previously processed co-occurrence constraints, "computers" and "camera phones" are white-listed combinations, but based on the third co-occurrence constraint, "computers" and "camera phones" are black-listed combinations.

Based on the override rule, the third co-occurrence constraint can override the portion of the combined co-occurrence constraint that conflicts with the third co-occurrence constraint. Therefore, the white colored edge 404 between the node "computers" 308 and the node "camera phones" 320 can be replaced by a black colored edge 410 when the third co-occurrence constraint is integrated into the combined co-occurrence constraint. A representation of the resulting combined co-occurrence constraint is shown in FIG. 4C.

In the above simplified example, only three co-occurrence constraints exist in the set of co-occurrence constraints. If more co-occurrence constraints remain in the co-occurrence constraint set, the remaining co-occurrence constraints can be processed in a similar manner as illustrated above. When all of the co-occurrence constraints in the set are processed, the resulting representation of the combined co-occurrence constraint can be stored. In some implementations, additional processing can be performed to transform the representation into an equivalent representation that contains only black edges or only white edges. The decision to transform a representation containing one type of edges (e.g., black edges) to an alternative representation containing an opposite type of edges (e.g., white edges) can be based on the amount of storage needed to store the two representations. The representation that uses a smaller amount of storage space can be stored.

In some implementations, a mix of black-list and white-list co-occurrence constraints are only allowed if all of the co-occurrence constraints in the set of co-occurrence constraints are specified in terms of categories, and not in terms of a category and a component or in terms of two components. If category to component or component to component co-occurrence constraints are used, the set of co-occurrence constraints are required to be either all black-list co-occurrence constraints or all white-list co-occurrence constraints. The reason for the above requirement is that when individual components are used to specify some co-occurrence constraints in the constraint set, it is difficult and sometimes impossible to traverse down to the component level in the directed acyclic graph in a deterministic manner. This is because components can be updated often, and the result of the traversal processing can be unpredictable when the set of available components changes.

Example Data Structure Representing Eligible Component Combinations

In some implementations, the combined co-occurrence constraint resulted from the processing of all co-occurrence constraints in a set of co-occurrence constraint can be stored in a relational data table.

In some implementations, a graph containing both black colored edges and white colored edges can be transformed to an equivalent graph that contains only white colored edges. The transformation is based on the assumption that the set of black colored edges and the set of white colored edges are complement sets of all possible category/component combinations for a given set of categories and components.

In some implementations, the relational data table storing the graph of the combined co-occurrence constraint can include four columns, namely, N1_type, N1_id, N2_type, and N2_id. N1_id and N2_id can represent two nodes in the graph representing the combined co-occurrence constraint that are linked by a white colored edge. Each row in the data table can represent the permission of co-occurrence between the two nodes. N1_type and N2_type are either categories or component types to which the nodes N1_id and N2_id belong. In some implementations, the rows are sorted first by N1_type and then by N2_type, such that the rows can be grouped first by N2_type, and then by N1_type.

In some implementations, the relational data table stores all of the permitted co-occurrence combinations. In some implementations, some of the permitted co-occurrence combinations are not stored in the relational data table if the permission can be inferred by default. For example, if components from one category can be combined with components of all other categories with no exception, then the permissions of the combinations between the one category and all other categories can be inferred by default and do not need to be explicitly stored in the relational data table. By allowing the default inference for categories not appearing in the relational data table, storage cost can be reduced.

In the examples discussed above, co-occurrence constraints are pair-wise constraints specified using three-tuples. In some implementations, n-pair-wise co-occurrence constraints can be specified using (n+1)-tuples. The (n+1)-tuple can be in the form of $(c\_1, c\_2, c\_3, \ldots, c\_n, \text{Boolean})$. The first n elements of the (n+1) tuple represent n categories or components that are permitted or prohibited from being simultaneously selected for a single dynamic ad. The Boolean of the (n+1)-tuple indicates whether the constraint is a prohibition (e.g., Boolean=FALSE) or a permission (Boolean=TRUE) of co-occurrence.

In some implementations, the data structure that can be used to store the n-pair-wise constraint set can be a relational data table of 2*n columns. Each pair of columns can indicate a type of a node (e.g., component type or content category)

specified in the constraint, and an identifier of the node. Each row in the relational data table can represent a permission of co-occurrence between the n nodes specified in that row. If some co-occurrence constraints are specified with fewer nodes than n nodes, these co-occurrence constraints imply that there is no constraint on the selection of nodes from other categories.

In some implementations, all eligible combinations of components are explicitly enumerated in the relational data table. When all eligible combinations of components are explicitly enumerated in the relational data table, the columns for node types (e.g., category or component type) are no longer necessary. The eligible combinations of components can be stored in an n-column relational data, each column indicating an identifier of the node.

As described in this specification, the explicit enumeration of the eligible component combinations stored in the relational data table are generated from a small set of co-occurrence constraints specified mostly in terms of categories in a component taxonomy hierarchy. The large set of explicit enumerations of the eligible component combinations are not manually provided by a human user, but are generated from the small set of co-occurrence constraints based on the structure of the component taxonomy and the processing rules on inheritance, override, and processing order.

The relational data table containing the eligible component combinations can be queried at the time for component selection for generating a dynamic ad, as discussed in more detail in the next section.

Example Query Model for Component Selection from Eligible Component Combinations In some implementations, when the advertising management system (e.g., through an ad server component) selects a dynamic ad creative to fulfill a received ad request, the advertising management needs to select the components required for the component slots in the dynamic ad creative. The advertising management system can determine the number of component slots that need to be filled, and select a first component based on various independently applied business rules. For example, the independently applied business rules can specify criteria for component selection based on information contained in the ad request (e.g., keywords, search query, etc.), information known about the requesting user (e.g., age, gender, income, etc.), or other information associated with the ad request (e.g., geographic location, time, language, etc.). After a first component is selected for a first component slot, other components can be selected for other component slots in the dynamic ad creative according to the set of co-occurrence constraints applicable to the dynamic ad creative.

In some other implementations, all components can be selected jointly from the set of eligible components that can co-occur in the dynamic ad without first selecting a first component. Joint selection of multiple components for the same dynamic ad can be advantageous sometimes, because it can avoid the adverse effect of a sub-optimal first selection to be carried onto subsequent selections of the remaining components based on the co-occurrence constraints. Joint selection of multiple components also allows the eligible combinations of components obtained from a query of the data table to be evaluated and ranked based on various information known about the components, such that the ultimate selection of a component combination can be based on the ranking of many eligible combinations.

In some implementations, after the set of co-occurrence constraints have been processed and eligible component combinations have been stored in a relational data table, the advertising management system can formulate a query against the relational data table to retrieve eligible components for a second component slot given the selection of the first component for the first component slot.

In some implementations, if the advertiser has specified multiple sets of co-occurrence constraints, the eligible component combinations derived from each set of co-occurrence constraints can be stored in separate relational data tables with their respective constraint set identifiers. For example, the advertiser can specify a co-occurrence constraint set for "background image" and "headline" combinations, a different co-occurrence constraint set for "product image" and "call to action" combinations, and yet another co-occurrence constraint set for selecting components of other component types. The query to retrieve eligible components for the second component slot can specify the applicable co-occurrence constraint set based on the component type of the first selected component and the component type of the second component to be selected.

For another example, the advertiser can specify several co-occurrence constraints that implement different component selection strategies. Each co-occurrence constraint set can be given a unique constraint set identifier. The query to retrieve eligible components for the second component slot can specify which co-occurrence constraint set to use based on one or more business rules specified by the advertiser. For example, the business rules for selecting the applicable co-occurrence constraint set can be based on the information in the ad request (e.g., keywords or search query), information known about the requesting user (e.g., age, gender, etc.), and/or other information related to the ad request (e.g., time, geographic location, etc.). Alternatively, the applicable co-occurrence constraint set can be selected based on some probability rules, such that each co-occurrence constraint set is used for a given percentage of all received ad requests.

In some implementations, the query for retrieving eligible second components given a selected first component can be a query written in the Structured Query Language (SQL) format. Queries formulated according to other database query languages are possible. In one example, if a dynamic ad creative has a "Hotel Image" slot and a "Background Image" slot, and a first image "Chicago hotel" is already selected for the "Hotel Image" slot, the query to retrieve possible images for the "Background Image" slot can be formulated as follows:

SELECT N2_id FROM Hotel Constraints WHERE N1_id=CategoryOf(Chicago hotel) AND N1_type=Category AND N2_type=Background Image Based on the above query, eligible component combinations that include a component of the "Background Images" type and a component from the category of the hotel image "Chicago hotel" can be identified from the relational data table for the constraint set "Hotel Constraints." The "Background Image" type components specified in the identified eligible component combinations can serve as the candidate components for the second "Background Image" slot.

In some implementations, the query can also specify a particular component data feed from which the components are selected. An example query can be formulated as follows:

SELECT <N2_category|N2_id|N2_attribute> FROM <feed_id> WHERE [CATEGORY=<N1_category> |COMPONENT=<N1_id>|ATTRIBUTE=<N1_attribute> AS PER CONSTRAINT SET <constraint_set_id>]

In the above query, <feed_id> specifies the component data feed from which the components can be selected. The <constraint_set_id> specifies the applicable constraint set that includes the eligible component combinations at a category level. N1_category, N1_id, and N1_attribute describes the category, identifier, and associated attributes of a first selected components, and the category, identifier, and associated attributes are used to identify components that are compatible with these characteristics of the first selected components.

In some implementations, the query can also request the retrieval of eligible pairs of components. An example query can be formulated as follows:

SELECT N1_id, N2_id FROM <constraint_id> WHERE N1_type=<component_type_1> and N2_type=<component_type_2> limit 1000.

This query can be used to retrieve all eligible pairs of components up to a limit of 1000, where one component of the pair is of component_type_1 and the other component of the pair is of component_type_2. The resulting eligible pairs returned by the query can be ranked by performance. In this example, the two components in the pair are not selected sequentially. Rather, all eligible pairs of components are retrieved, and the pairs of components are compared against one another for a dynamic content item.

In some implementations, when components are selected for additional component slots in the dynamic ad creative, multiple selection criteria referencing characteristics of all previously selected components can be combined using Boolean operators. In some implementations, eligible components selected based on different constraint sets can be combined using logic/set operations. In some implementations, the logic/set operations (e.g., unions (ORs), intersections (ANDs), exclusive ors (XORs)) can be performed using the database queries (e.g., SQL queries) directly, such that unions, intersections, exclusive ors of the results of multiple queries can be obtained efficiently.

In some implementations, the eligible component combinations derived from each co-occurrence constraint set can be stored in a respective compressed bit map. Compressed bit maps provide an efficient way to perform logic/set operations over very large datasets. In addition, various techniques for optimizing data storage and data compression for the compressed bit maps can be utilized to ensure high compression ratio while allowing many logic/set operations to be completed on the compressed bit maps without decompressing the bit map data.

In some implementations, when selecting components for a dynamic ad creative, candidate components for each component slot can be scored individually and jointly based on performance data available for the candidate components. Based on these scores, the selection of components for a dynamic ad can be adjusted to meet predetermined performance goals. Such flexibility in component selection based on performance scores of individual components is not available in implementations where all permissible component combinations are explicitly enumerated by the advertiser and where performance of the explicitly enumerated component combinations are not assessed based on the performance of its constituent components.

Figure 5:
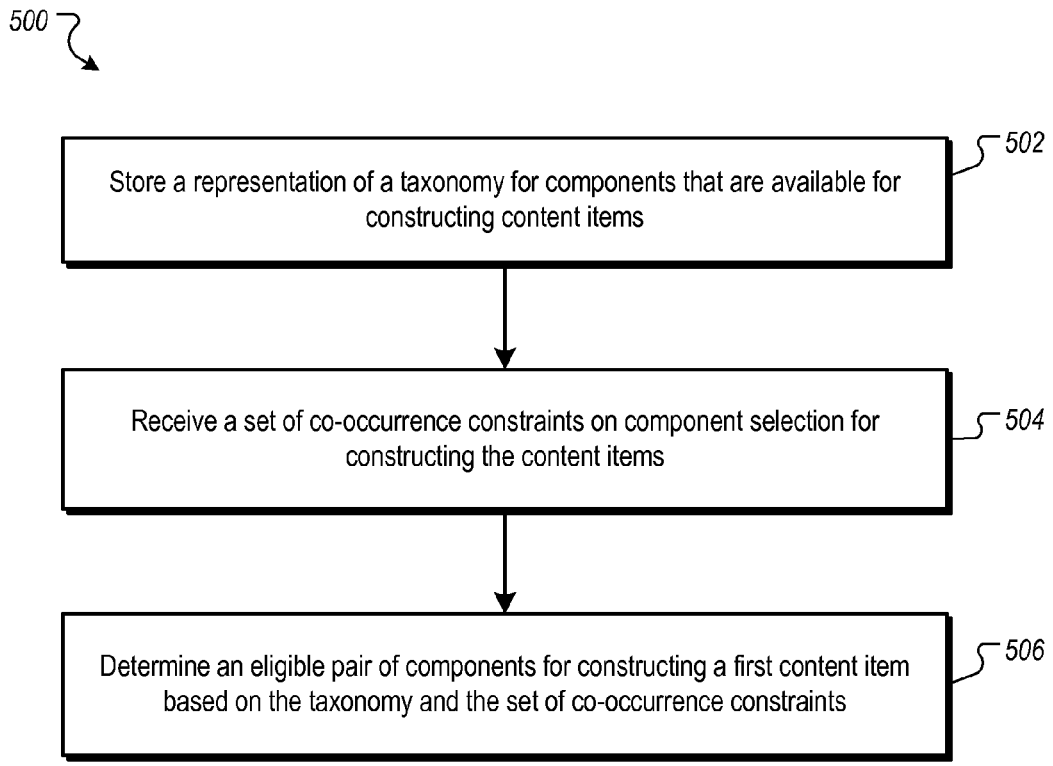
FIG. 5 is a flow diagram of an example process for component selection based on co-occurrence constraints specified according to a component taxonomy hierarchy.

Example Processes for Representing and Processing Co-Occurrence Constraints and Component Selection from Eligible Component Combinations FIG. 5 is a flow diagram of an example process 500 for component selection based on co-occurrence constraints specified according to a component taxonomy hierarchy. In the example process 500, a representation of a taxonomy for components that are available for constructing content items is stored (502). The taxonomy includes a hierarchy of categories. Each component can belong to one or more categories each descending from a root category through respective zero or more intermediate categories in the hierarchy.

In the process 500, a set of co-occurrence constraints on component selection for constructing the content items is received (504). At least a first co-occurrence constraint of the set of co-occurrence constraints specifies a permission or a prohibition of simultaneous selection of components from a first collection of components and components from a second collection of components for a single content item. The first co-occurrence constraint identifies at least the first collection of components in terms of an intermediate category in the hierarchy of categories.

Based on the taxonomy and the set of co-occurrence constraint, an eligible pair of components for constructing a first content item is determined (506).

In some implementations, the first co-occurrence constraint specifies the second collection of components in terms of a category in the hierarchy or a component that belongs to a category of the hierarchy.

Figure 6:
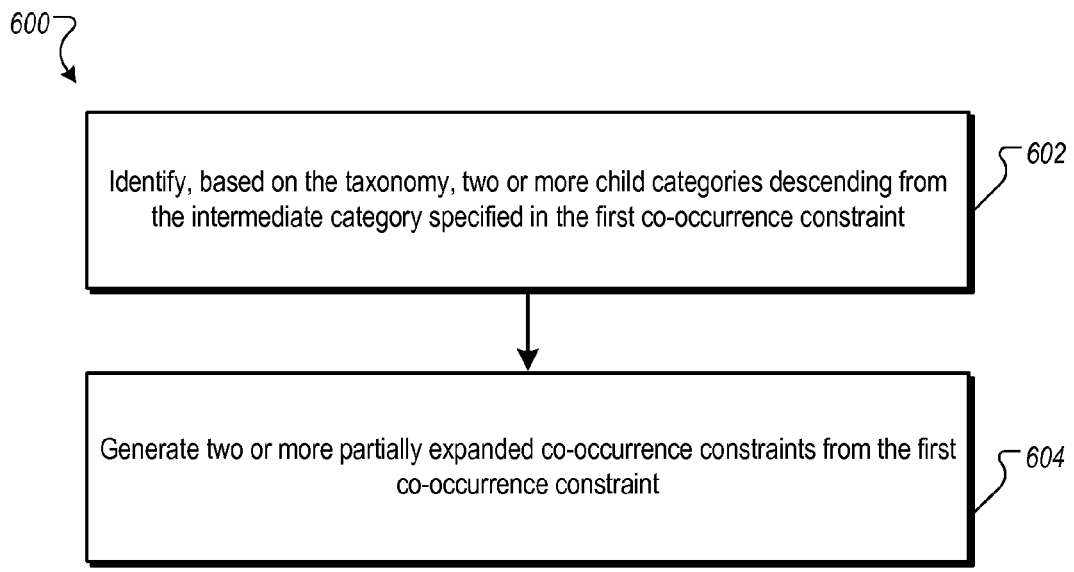
FIG. 6 is a flow diagram of an example process for expanding a co-occurrence constraint based on an inheritance rule associated with the component taxonomy hierarchy.

FIG. 6 is a flow diagram of an example process 600 for expanding an example co-occurrence constraint based on an inheritance rule associated with the component taxonomy hierarchy. The process 600 can be performed after the set of co-occurrence constraints are received in the process 500. The expansion of a co-occurrence constraint can be a full expansion, with the fully expanded co-occurrence constraints are component-to-component co-occurrence constraints that are derived from the original co-occurrence constraint specified in terms of at least one intermediate category. The expansion of a co-occurrence constraint can also be partial expansions. The partial expansion can stop at the levels of one or more subcategories of the at least one intermediate category. When partially expanded, the original co-occurrence constraint specifying at least one intermediate category can be converted to two or more co-occurrence constraints each specifying a sub-category (or subcategories) of the at least one intermediate category, and these two or more co-occurrence constraints are partially expanded co-occurrence constraints of the original co-occurrence constraint. A partially expanded co-occurrence constraint can be further expanded to two or more additional partially expanded co-occurrence constraints or two or more component-to-component co-occurrence constraints.

In the example process 600, based on the taxonomy, two or more child categories descending from the intermediate category specified in the first co-occurrence constraint is identified (602). Then, two or more partially expanded co-occurrence constraints are generated from the first co-occurrence constraint (604). Each of the two or more partially expanded co-occurrence constraints specifies the permission or the prohibition of simultaneous selection of: (A) components from the second collection of components specified in the first co-occurrence constraint and (B) components from a respective partial subset of the first collection of components specified in the first co-occurrence constraint. In addition, each of the partially expanded co-occurrence constraints can identify the respective partial subset of the first collection of items in terms of a respective one of the two or more child categories descending from the intermediate category specified in the first co-occurrence constraint.

Figure 7:
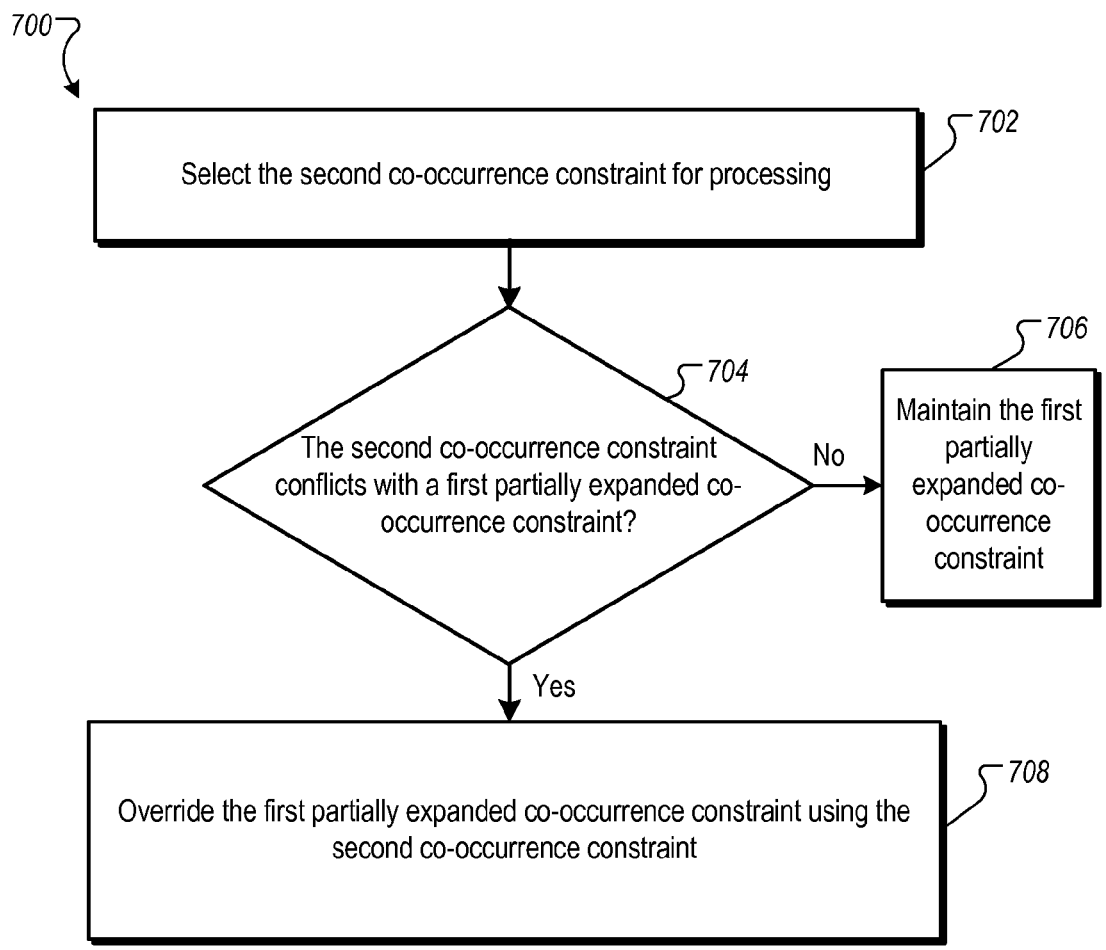
FIG. 7 is a flow diagram of an example process for resolving conflicts between co-occurrence constraints based on an override rule associated with the component taxonomy hierarchy.

FIG. 7 is a flow diagram of an example process 700 for resolving conflicts between co-occurrence constraints in a co-occurrence constraint set based on an override rule associated with the component taxonomy hierarchy.

In some implementations, in addition to the first co-occurrence constraint described above, the set of co-occurrence constraints further includes a second co-occurrence constraint. In some cases, the second co-occurrence constraint can be specified between the second collection of components and a first partial subset of the first collection of items, and the second co-occurrence constraint identifies the first partial subset of the first collection of components in terms of a first child category descending from the intermediate category specified in the first co-occurrence constraint.

In the example process 700, first, the second co-occurrence constraint is selected for processing (702). Then, it is determined whether the second co-occurrence constraint conflicts with a first partially expanded co-occurrence constraint generated from the first co-occurrence constraint (704). If it is determined that there is a conflict between the second co-occurrence constraint and the first partially expanded co-occurrence constraint, the first partially expanded co-occurrence constraint is overridden using the second co-occurrence constraint (706). If it is determined that there is no conflict between the second co-occurrence constraint and the first partially expanded co-occurrence constraint, the first partially expanded co-occurrence constraint is maintained and not overridden by the second co-occurrence constraint.

Figure 8:
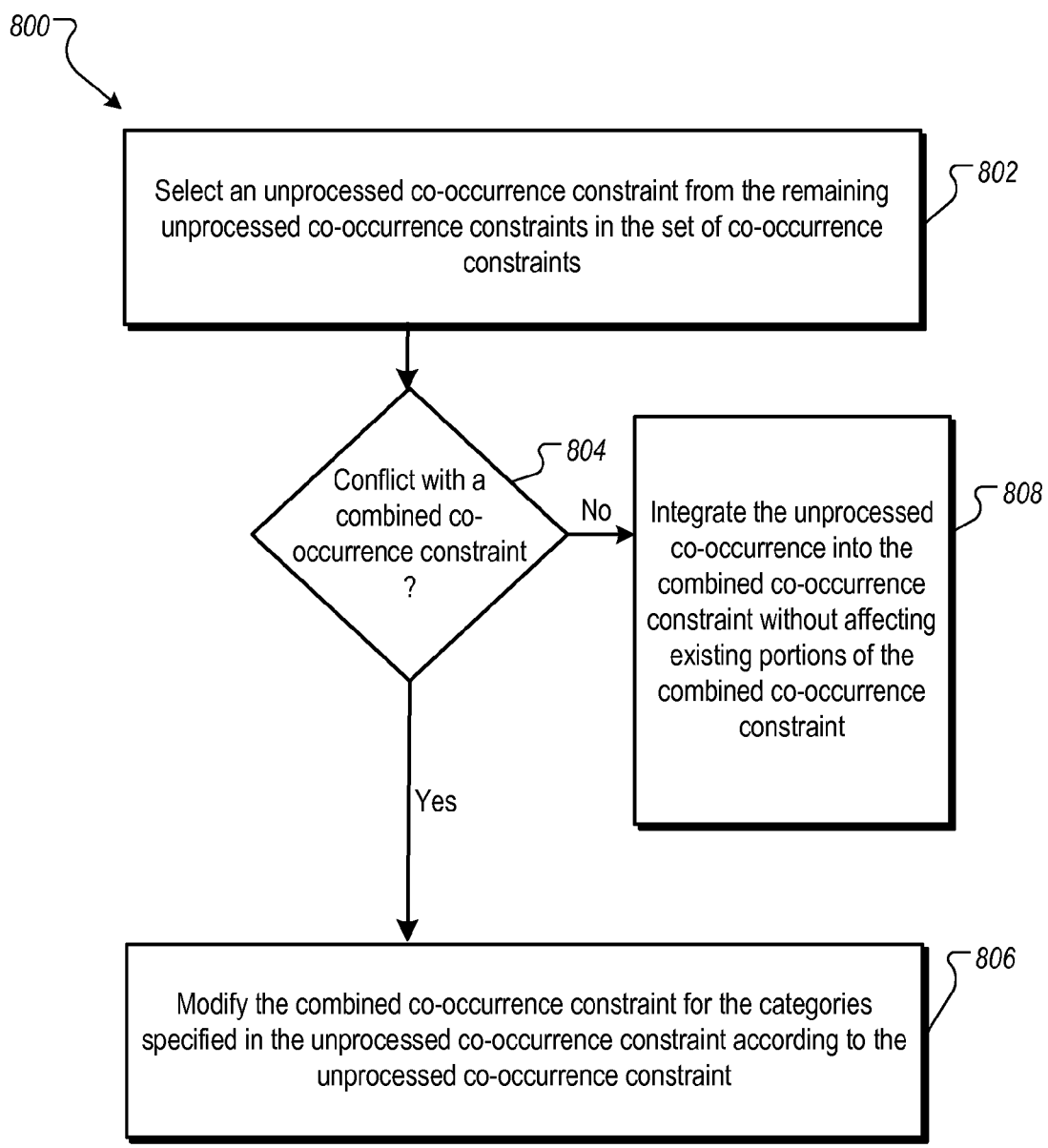
FIG. 8 is a flow diagram of an example process for processing a set of co-occurrence constraints based on a processing order rule associated with the component taxonomy hierarchy.

FIG. 8 is a flow diagram of an example process 800 for processing a set of co-occurrence constraints based on a processing order rule associated with the component taxonomy hierarchy. In some implementations, each of the set of co-occurrence constraints can be specified in terms of two or more categories in the hierarchy, and the permission or the prohibition of simultaneous selection of components specified in the co-occurrence constraint applies by default to all subcategories that descend from the two or more categories.

In the process 800, the set of co-occurrence constraints is processed in an order according to a top-down deterministic traversal of the hierarchy to resolve possible conflicts between the set of co-occurrence constraints. Each unprocessed co-occurrence constraint in the set of co-occurrence constraints is processed when a category specified in the unprocessed co-occurrence constraint is reached during the top-down deterministic traversal of the hierarchy.

In the process 800, an unprocessed co-occurrence constraint is first selected from the remaining unprocessed co-occurrence constraints in the set of co-occurrence constraints (802). The selection of the unprocessed co-occurrence constraint is based on an order determined according to a top-down deterministic traversal of the hierarchy. For the selected unprocessed co-occurrence constraint, it is determined whether the unprocessed co-occurrence constraint conflicts with a combined co-occurrence constraint generated from previously processed co-occurrence constraints (804). In response to a determination that the unprocessed co-occurrence constraint conflicts with the combined co-occurrence constraint, the combined co-occurrence constraint for the categories specified in the unprocessed co-occurrence constraint is modified according to the unprocessed co-occurrence constraint (806). If it is determined that the unprocessed co-occurrence constraint does not conflict with the combined co-occurrence constraint, then the unprocessed co-occurrence is integrated into the combined co-occurrence constraint without affecting the existing portions of the combined co-occurrence constraint (808).

Figure 9:
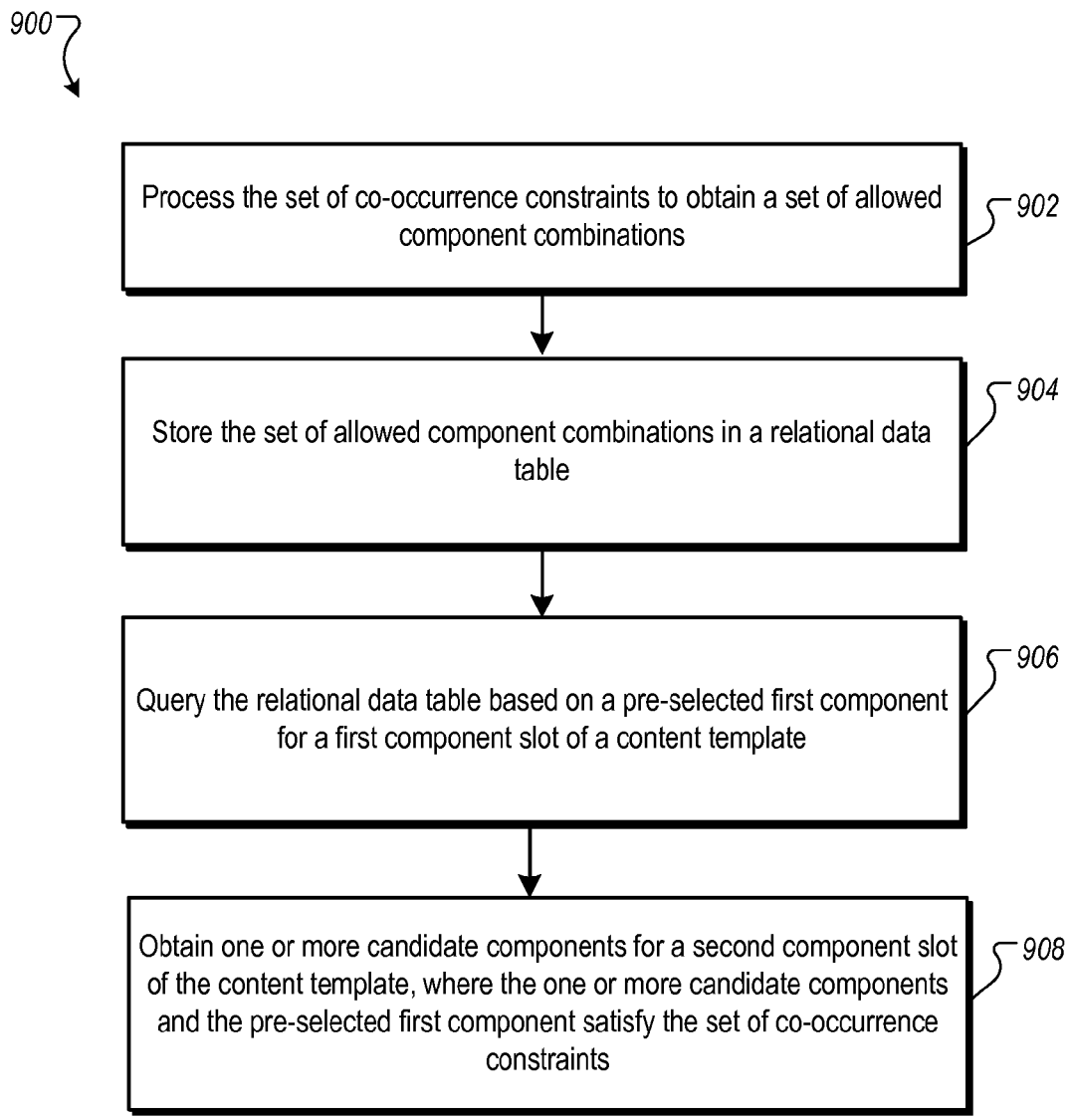
FIG. 9 is a flow diagram of an example process for storing and querying a relational data table containing eligible component combinations derived from the processed co-occurrence constraint set.

FIG. 9 is a flow diagram of an example process 900 for storing and querying a relational data table containing eligible component combinations derived from the processed co-occurrence constraint set.

In the example process 900, the set of co-occurrence constraints is processed to obtain a set of allowed component combinations (902). Then, the set of allowed component combinations is stored in a relational data table (904). The relational data table is queried based on a pre-selected first component for a first component slot of a content template (906). As a result of the query, one or more candidate components for a second component slot of the content template is obtained, where the one or more candidate components and the pre-selected first component satisfy the set of co-occurrence constraints (908).

In some implementations, at least one of set of co-occurrence constraints can be processed to obtain a corresponding default co-occurrence constraint that is not explicitly included in the set of co-occurrence constraints. Where the at least one co-occurrence constraint specifies a lowest level category among all the co-occurrence constraints in the set of co-occurrence constraint set and specifies a co-occurrence limitation of a first type, the corresponding default co-occurrence constraint can be a more generally applicable co-occurrence constraint than the at least one co-occurrence constraint. The default co-occurrence constraint specifies a co-occurrence limitation of a second type opposite to the first type, and is applicable to all combinations not covered by the at least one co-occurrence constraint.

Figure 10:
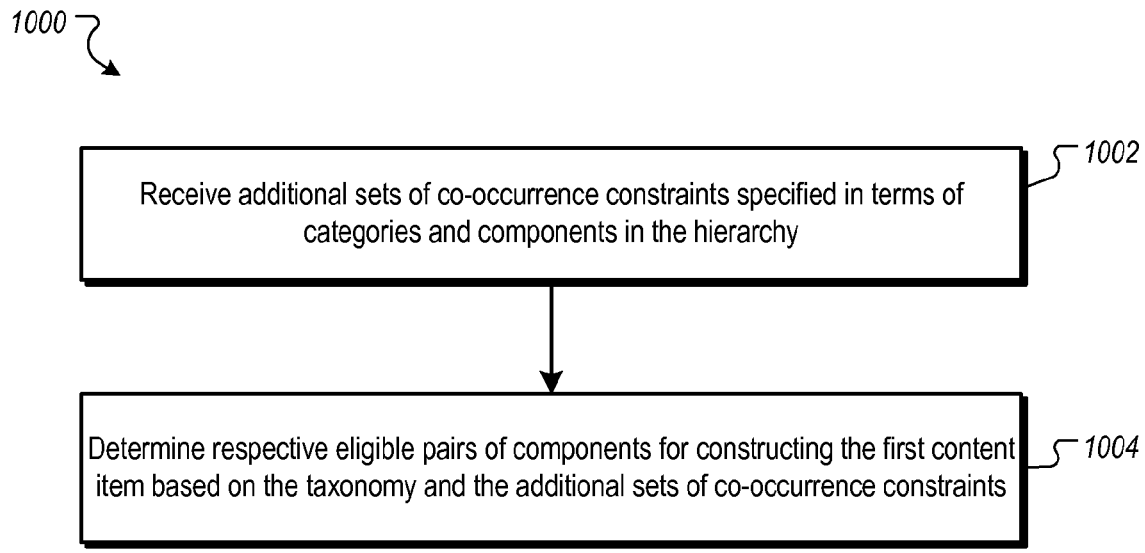
FIG. 10 is a flow diagram of an example process for determining eligible component combinations based on multiple alternative sets of co-occurrence constraints.

FIG. 10 is a flow diagram of an example process 1000 for determining eligible component combinations based on multiple alternative sets of co-occurrence constraints. In the process 1000, one or more additional sets of co-occurrence constraints specified in terms of categories and components in the hierarchy can be received (1002). Respective eligible pairs of components for constructing the first content item can be determined based on the taxonomy and the one or more additional sets of co-occurrence constraints (1004).

Figure 11:
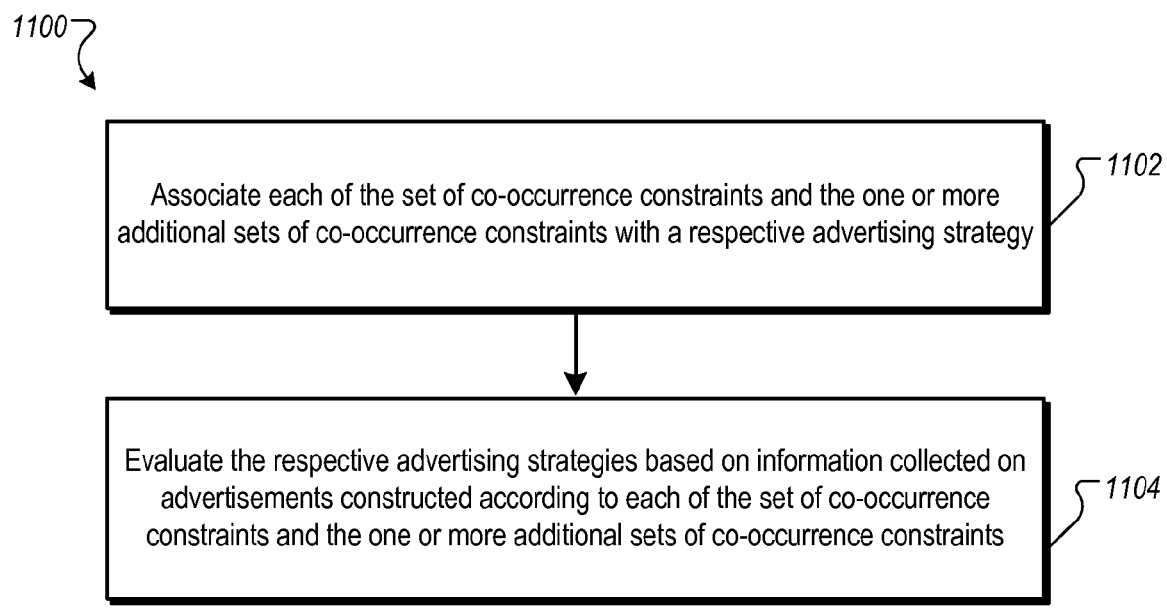
FIG. 11 is a flow diagram of an example process for evaluating multiple advertising strategies using multiple alternative sets of co-occurrence constraints.

FIG. 11 is a flow diagram of an example process 1100 for evaluating multiple advertising strategies using multiple alternative sets of co-occurrence constraints. In the example process 1100, each of the set of co-occurrence constraints and the one or more additional sets of co-occurrence constraints can be associated with a respective advertising strategy (1102). The respective advertising strategies can be evaluated based on information collected on advertisements constructed according to each of the set of co-occurrence constraints and the one or more additional sets of co-occurrence constraints (1104).

Figure 12:
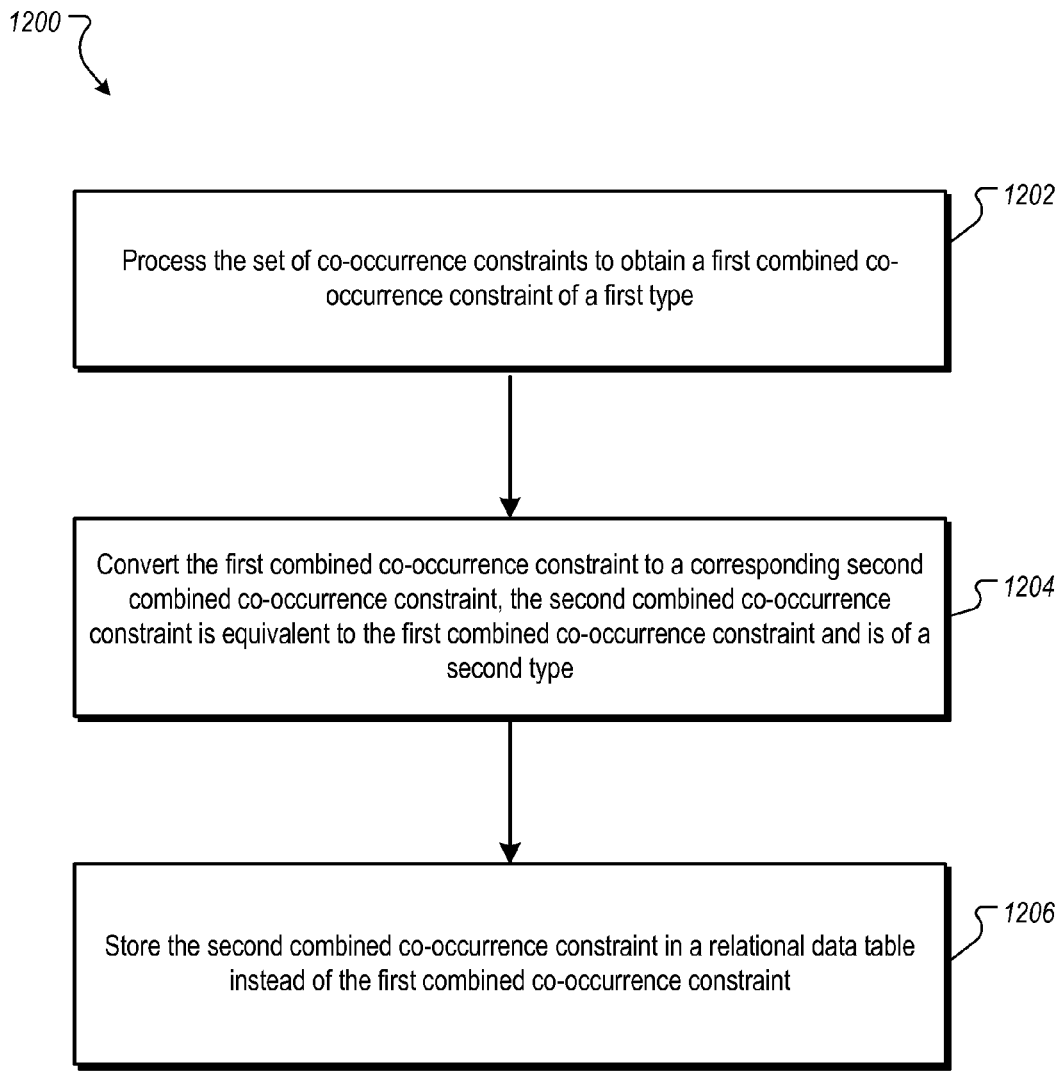
FIG. 12 is a flow diagram of an example process for converting a co-occurrence constraint set of one constraint type to an equivalent co-occurrence constraint set of an opposite constraint set.

FIG. 12 is a flow diagram of an example process 1200 for converting a co-occurrence constraint set of one constraint type to an equivalent co-occurrence constraint set of an opposite constraint set. In the example process 1200, the set of co-occurrence constraints can be processed to obtain a first combined co-occurrence constraint of a first type, the first type being one of a white-list constraint type and a black-list constraint type (1202). The first combined co-occurrence constraint can be converted to a corresponding second combined co-occurrence constraint (1204). The second combined co-occurrence constraint is equivalent to the first combined co-occurrence constraint and is of a second type, where the second type is one of the white-list constraint type and the black-list type, and is different from the first type. The second combined co-occurrence constraint can then be stored in a relational data table instead of the first combined co-occurrence constraint (1206).

Figure 13:
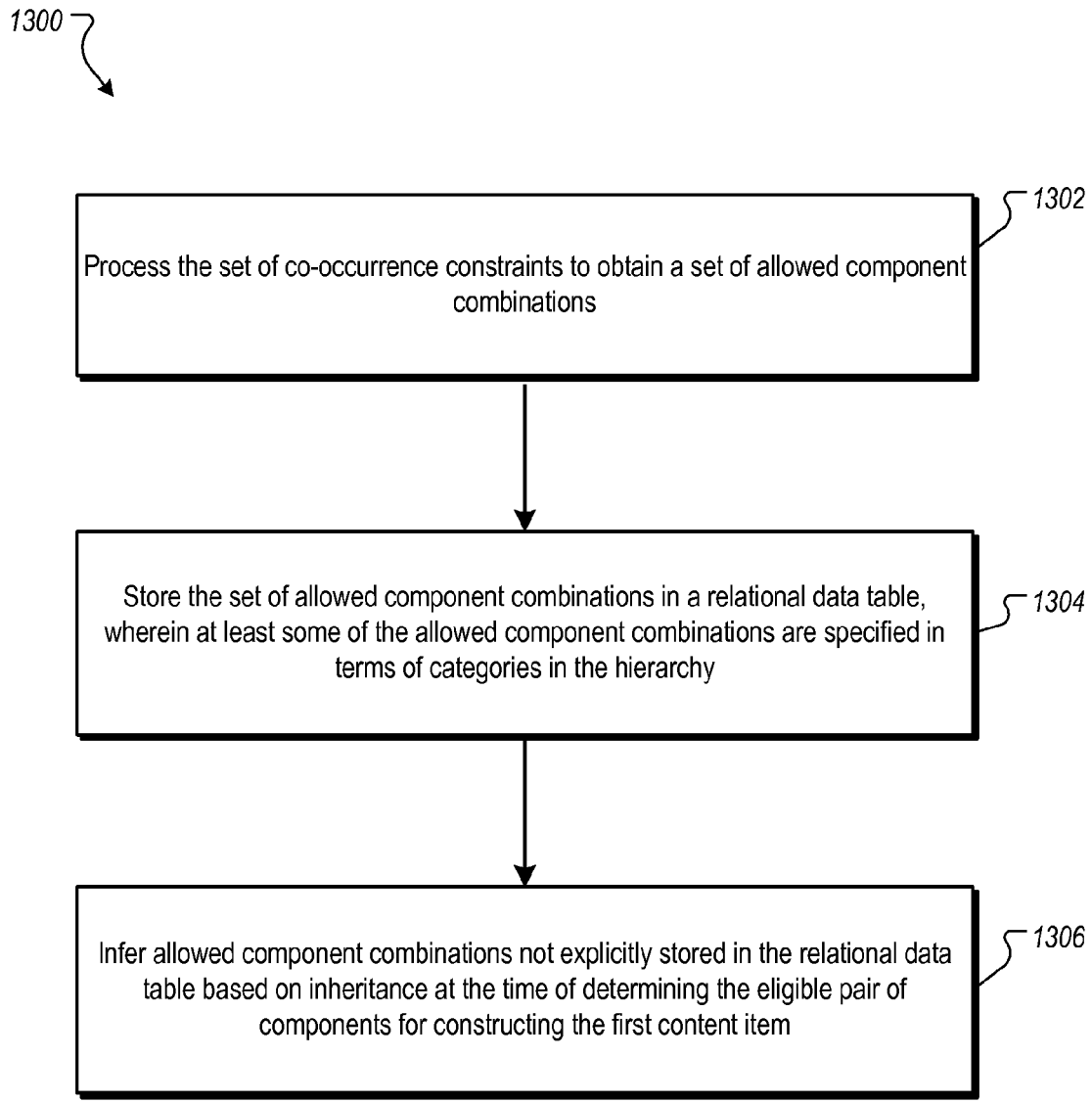
FIG. 13 is a flow diagram of an example process for inferring default co-occurrence constraints based on an inheritance rule at the time of component selection.

FIG. 13 is a flow diagram of an example process 1300 for inferring default co-occurrence constraints based on an inheritance rule at the time of component selection. In the example process 1300, the set of co-occurrence constraints are processed to obtain a set of allowed component combinations (1302). The set of allowed component combinations are stored in a relational data table, where at least some of the allowed component combinations are specified in terms of categories in the hierarchy (1304). Then, allowed component combinations not explicitly stored in the relational data table can be inferred based on inheritance at the time of determining the eligible pair of components for constructing the first content item (1306).

Figure 14:
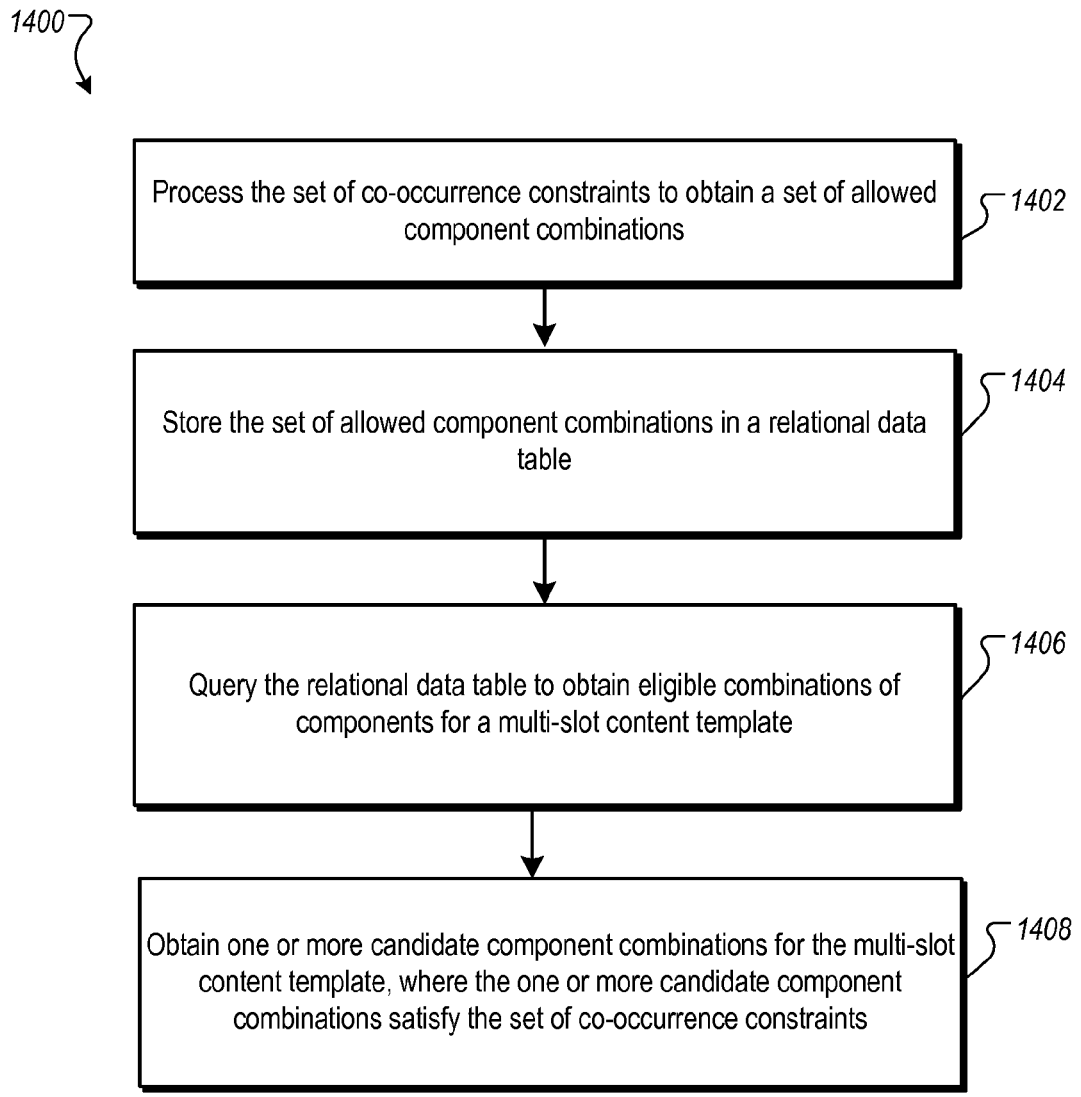
FIG. 14 is a flow diagram of an example process for obtaining eligible component combinations for a multi-slot content template.

FIG. 14 is a flow diagram of an example process 1400 for obtaining eligible component combinations for a multi-slot content template. In the example process 1400, the set of co-occurrence constraints are processed to obtain a set of allowed component combinations (1402). The set of allowed component combinations are stored in a relational data table (1404). The relational data table is queried to obtain eligible combinations of components for a multi-slot content template (1406). One or more candidate component combinations for the multi-slot content template are obtained in response to the query, where the one or more candidate component combinations satisfy the set of co-occurrence constraints (1408). In some implementations, the one or more candidate component combinations are ranked based on performance data associated with the candidate component combinations.

The above example processes are merely illustrative. Other example processes are apparent from the description in other parts of the specification and drawings. The processes described in this specification can be implemented by the advertising management system or a component thereof. Different processes can be implemented together or separately.

Example Data Processing Apparatus

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by one or more data processing apparatus, comprising:
    storing a representation of a taxonomy for components that are available for constructing content items, wherein the taxonomy includes a hierarchy of categories, and each component belongs to one or more categories, each of the categories being a child node descending directly or through one or more intermediate categories from a root category;
    receiving a set of co-occurrence constraints on component selection for constructing the content items wherein each co-occurrence constraint of the set of co-occurrence constraints specifies a permission or a prohibition of simultaneous selection of components a respective first category and components from a respective second category for a single content item, and wherein a permission or a prohibition for a category specified in the co-occurrence constraint applies to all subcategories that descend from the first and second categories;
    determining a processing order of each co-occurrence constraint that is based on a level of one of the respective nodes of the respective categories of the co-occurrence constraint, and the processing order defines a processing sequence of the co-occurrence constraints according to a top-down deterministic traversal of categories of same levels of the hierarchy so that co-occurrence constraints for a category at a given level of the hierarchy are processed prior to processing co-occurrence constraints of categories of one or more child levels of the given level, each co-occurrence constraint in the set of co-occurrence constraints being processed for a respective category specified in the co-occurrence constraint when the category is reached during the top-down deterministic traversal of the hierarchy;
    processing the co-occurrence constraints according to the processing order to generate combined co-occurrence constraints, the processing comprising resolving conflicts between co-occurrence constraints that are discovered during the top-down deterministic traversal of the hierarchy in an order of discovery so that a conflict between a first co-occurrence constraint and a second co-occurrence constraint that is processed subsequent to the first co-occurrence constraint in the processing order is resolved so that the second co-occurrence constraint overrides the first co-occurrence constraint when the second co-occurrence constraint is processed;
    determining an eligible pair of components for constructing a first content item based on the taxonomy and the combined co-occurrence constraints;
wherein:
    storing the representation of the taxonomy further comprises storing a directed acyclic graph, each category of the taxonomy being represented as a node in the directed acyclic graph, and a directed edge from a first node to a second node in the directed acyclic graph indicates that a second category represented by the second node descends from a first category represented by the first node and that the second category is a subcategory of the first category; and
    each of the set of co-occurrence constraints is expressed as a respective (n+1)-tuple of a form $(c\_1, c\_2, \ldots, c\_n, Boolean)$, where $c\_1, c\_2, \ldots, c\_n$ are nodes in the directed acyclic graph, and the Boolean represents either a permission or a prohibition of simultaneous selection of n components, each of the n components being associated with a respective one of the n nodes.

2. The method of claim 1, further comprising:
    identifying, based on the taxonomy, two or more child categories descending from an intermediate category specified in a first co-occurrence constraint; and
    generating two or more partially expanded co-occurrence constraints from the first co-occurrence constraint;

wherein each of the two or more partially expanded co-occurrence constraints specifies the permission or the prohibition of simultaneous selection of components from the second collection of components and components from a respective partial subset of a first collection of components, and wherein each of the partially expanded co-occurrence constraints identifies the respective partial subset of a first collection of items in terms of a respective one of the two or more child categories descending from the intermediate category specified in the first co-occurrence constraint.

3. The method of claim 2, wherein the set of co-occurrence constraints further includes a second co-occurrence constraint, the second co-occurrence constraint being specified between the second collection of components and a first partial subset of the first collection of items, and the second co-occurrence constraint identifying the first partial subset of the first collection of components in terms of a first child category descending from the intermediate category specified in the first co-occurrence constraint, and wherein resolving conflicts between co-occurrence constraints that are discovered during the top-down deterministic traversal of the hierarchy in an order of discovery so that a conflict between a first co-occurrence constraint and a second co-occurrence constraint that is processed subsequent to the first co-occurrence constraint comprises:

determining the second co-occurrence constraint conflicts with a first partially expanded co-occurrence constraint generated from the first co-occurrence constraint; and upon determination that there is a conflict between the second co-occurrence constraint and the first partially expanded co-occurrence constraint, overriding the first partially expanded co-occurrence constraint using the second co-occurrence constraint.

4. The method of claim 1, wherein the categories of the taxonomy are defined based on content of the components available for structuring the content items, each component belongs to a respective parent category and all categories from which the respective parent category descends, and each component is associated with one of a plurality of component types based on a structure of the component or a function of the component in the content items.

5. The method of claim 1, further comprising:
processing the set of co-occurrence constraints to obtain a set of allowed component combinations;
storing the set of allowed component combinations in a relational data table;
querying the relational data table based on a pre-selected first component for a first component slot of a content template; and
obtaining one or more candidate components for a second component slot of the content template, where the one or more candidate components and the pre-selected first component satisfy the set of co-occurrence constraints.

6. The method of claim 1, further comprising:
processing at least one of a set of co-occurrence constraints to obtain a corresponding default co-occurrence constraint that is not explicitly included in the set of co-occurrence constraints,
wherein the at least one co-occurrence constraint specifies a lowest level category among all the co-occurrence constraints in the set of co-occurrence constraint set and specifies a co-occurrence limitation of a first type, and
wherein the corresponding default co-occurrence constraint specifies a co-occurrence limitation of a second type opposite to the first type, and applicable to only combinations not covered by the at least one co-occurrence constraint.

7. The method of claim 1, further comprising:
receiving one or more additional sets of co-occurrence constraints specified in terms of categories and components in the hierarchy; and
determining respective eligible pairs of components for constructing the first content item based on the taxonomy and the one or more additional sets of co-occurrence constraints.

8. The method of claim 7, further comprising:
associating each of the set of co-occurrence constraints and the one or more additional sets of co-occurrence constraints with a respective advertising strategy; and
evaluating the respective advertising strategies based on information collected on advertisements constructed according to each of the set of co-occurrence constraints and the one or more additional sets of co-occurrence constraints.

9. The method of claim 1, further comprising:
processing the set of co-occurrence constraints to obtain a first combined co-occurrence constraint of a first type, the first type being one of a white-list constraint type and a black-list constraint type;
converting the first combined co-occurrence constraint to a corresponding second combined co-occurrence constraint, the second combined co-occurrence constraint is equivalent to the first combined co-occurrence constraint and is of a second type, wherein the second type is one of the white-list constraint type and the black-list type, and is different from the first type; and
storing the second combined co-occurrence constraint in a relational data table instead of the first combined co-occurrence constraint.

10. The method of claim 1, further comprising:
processing the set of co-occurrence constraints to obtain a set of allowed component combinations;
storing the set of allowed component combinations in a relational data table, wherein at least some of the allowed component combinations are specified in terms of categories in the hierarchy; and
inferring allowed component combinations not explicitly stored in the relational data table based on inheritance at the time of determining the eligible pair of components for constructing the first content item.

11. The method of claim 1, further comprising:
processing the set of co-occurrence constraints to obtain a set of allowed component combinations;
storing the set of allowed component combinations in a relational data table;
querying the relational data table to obtain eligible combinations of components for a multi-slot content template; and
obtaining one or more candidate component combinations for the multi-slot content template, where the one or more candidate component combinations satisfy the set of co-occurrence constraints.

12. The method of claim 11, wherein the one or more candidate component combinations are ranked based on performance data associated with the candidate component combinations.

13. A computer-readable medium storage device having instructions stored thereon, the instructions, when executed by one or more processors, cause the one or more processors to perform operations comprising:

storing a representation of a taxonomy for components that are available for constructing content items, wherein the taxonomy includes a hierarchy of categories, and each component belongs to one or more categories each of the categories being a child node descending directly or through one or more intermediate categories;

receiving a set of co-occurrence constraints on component selection for constructing the content items, wherein each co-occurrence constraint of the set of co-occurrence constraints specifies a permission or a prohibition of simultaneous selection of components from a respective first category and components from a respective second category for a single content item, and wherein a permission or a prohibition for a category specified in the co-occurrence constraint applies to all subcategories that descend from the first and second categories;

determining a processing order of each co-occurrence constraint that is based on a level of one of the respective nodes of the respective categories of the co-occurrence constraint, and the processing order defines a processing sequence of the co-occurrence constraints according to a top-down deterministic traversal of categories of same levels of the hierarchy so that co-occurrence constraints for a category at a given level of the hierarchy are processed prior to processing co-occurrence constraints of categories of one or more child levels of the given level, each co-occurrence constraint in the set of co-occurrence constraints being processed for a respective category specified in the co-occurrence constraint when the category is reached during the top-down deterministic traversal of the hierarchy;

processing the co-occurrence constraints according to the processing order to generate combined co-occurrence constraints, the processing comprising resolving conflicts between co-occurrence constraints that are discovered during the top-down deterministic traversal of the hierarchy in an order of discovery so that a conflict between a first co-occurrence constraint and a second co-occurrence constraint that is processed subsequent to the first co-occurrence constraint in the processing order is resolved so that the second co-occurrence constraint overrides the first co-occurrence constraint when the second co-occurrence constraint is processed;

determining an eligible pair of components for constructing a first content item based on the taxonomy and the set of co-occurrence constraints;

wherein:

storing the representation of the taxonomy further comprises storing a directed acyclic graph, each category of the taxonomy being represented as a node in the directed acyclic graph, and a directed edge from a first node to a second node in the directed acyclic graph indicates that a second category represented by the second node descends from a first category represented by the first node and that the second category is a subcategory of the first category; and each of the set of co-occurrence constraints is expressed as a respective (n+1)-tuple of a form $(c\_1, c\_2, \ldots, c\_n, \text{Boolean})$, where $c\_1, c\_2, \ldots, c\_n$ are nodes in the directed acyclic graph, and the Boolean represents either a permission or a prohibition of simultaneous selection of n components, each of the n components being associated with a respective one of the n nodes.

14. A system, comprising:

one or more processors; and memory storing instructions, the instructions, when executed by the one or more processors, cause the one or more processors to perform operations comprising:

storing a representation of a taxonomy for components that are available for constructing content items, wherein the taxonomy includes a hierarchy of categories, and each component belongs to one or more categories, each of the categories being a child node descending directly or through one or more intermediate categories from a root category;

receiving a set of co-occurrence constraints on component selection for constructing the content items, wherein each co-occurrence constraint of the set of co-occurrence constraints specifies a permission or a prohibition of simultaneous selection of components from a respective first category and components from a respective second category for a single content item, and wherein a permission or a prohibition for a category specified in the co-occurrence constraint applies to all subcategories that descend from the first and second categories;

determining a processing order of each co-occurrence constraint that is based on a level of one of the respective nodes of the respective categories of the co-occurrence constraint, and the processing order defines a processing sequence of the co-occurrence constraints according to a top-down deterministic traversal of categories of same levels of the hierarchy so that co-occurrence constraints for a category at a given level of the hierarchy are processed prior to processing co-occurrence constraints of categories of one or more child levels of the given level, each co-occurrence constraint in the set of co-occurrence constraints being processed for a respective category specified in the co-occurrence constraint when the category is reached during the top-down deterministic traversal of the hierarchy;

processing the co-occurrence constraints according to the processing order to generate combined co-occurrence constraints, the processing comprising resolving conflicts between co-occurrence constraints that are discovered during the top-down deterministic traversal of the hierarchy in an order of discovery so that a conflict between a first co-occurrence constraint and a second co-occurrence constraint that is processed subsequent to the first co-occurrence constraint in the processing order is resolved so that the second co-occurrence constraint overrides the first co-occurrence constraint when the second co-occurrence constraint is processed;

determining an eligible pair of components for constructing a first content item based on the taxonomy and the set of co-occurrence constraints;

wherein:

storing the representation of the taxonomy further comprises storing a directed acyclic graph, each category of the taxonomy being represented as a node in the directed acyclic graph, and a directed edge from a first node to a second node in the directed acyclic graph indicates that a second category represented by the second node descends from a first category represented by the first node and that the second category is a subcategory of the first category; and each of the set of co-occurrence constraints is expressed as a respective (n+1)-tuple of a form $(c\_1, c\_2, \ldots, c\_n, \text{Boolean})$, where $c\_1, c\_2, \ldots, c\_n$ are nodes in the directed acyclic graph, and the Boolean represents either a permission or a prohibition of simultaneous selection of n components, each of the n components being associated with a respective one of the n nodes.

* * * * *

UNITED STATES PATENT AND TRADEMARK OFFICE
CERTIFICATE OF CORRECTION

PATENT NO. : 8,533,225 B2
APPLICATION NO. : 12/891595
DATED : September 10, 2013
INVENTOR(S) : Vishal Goenka Page 1 of 1

It is certified that error appears in the above-identified patent and that said Letters Patent is hereby corrected as shown below:

In the Claims

In Claim 1, Column 34, Line 8, delete "a" and insert -- from a --, therefor.

Signed and Sealed this
Sixth Day of May, 2014

Michelle K. Lee
*Deputy Director of the United States Patent and Trademark Office*